United States Patent
Tonegawa

(10) Patent No.: US 8,614,816 B2
(45) Date of Patent: *Dec. 24, 2013

(54) COMMUNICATIONS DEVICE AND CONTROL METHOD FOR TRANSMITTING AN IMAGE BY ELECTRONIC MAIL

(75) Inventor: Nobuyuki Tonegawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/711,190

(22) Filed: Feb. 23, 2010

(65) Prior Publication Data

US 2010/0153510 A1 Jun. 17, 2010

Related U.S. Application Data

(63) Continuation of application No. 10/503,221, filed as application No. PCT/JP03/01115 on Feb. 4, 2003, now Pat. No. 7,697,171.

(30) Foreign Application Priority Data

Feb. 7, 2002 (JP) .................................. 2002-030918

(51) Int. Cl.
*G06F 3/12* (2006.01)
*G06F 15/173* (2006.01)
*G06K 15/00* (2006.01)
*H04N 1/00* (2006.01)

(52) U.S. Cl.
USPC ........ 358/1.15; 358/1.13; 358/1.14; 358/402; 709/224; 709/226; 709/239; 709/242

(58) Field of Classification Search
None
See application file for complete search history.

(56) References Cited

U.S. PATENT DOCUMENTS

| 5,777,989 | A | 7/1998 | McGarvey |
| 5,937,162 | A | 8/1999 | Funk |
| 6,131,095 | A | 10/2000 | Low |
| 6,335,966 | B1 * | 1/2002 | Toyoda ..................... 379/100.06 |
| 6,532,217 | B1 | 3/2003 | Wootton et al. |
| 6,836,789 | B1 * | 12/2004 | Toyoda ......................... 709/206 |

(Continued)

FOREIGN PATENT DOCUMENTS

| EP | 1338952 | 8/2003 |
| EP | 1452989 | 1/2004 |

(Continued)

OTHER PUBLICATIONS

Sumio Hiroshi; "Information Transmission Device/Method"; JP Pub Date Mar. 1999; Machine Translation in English of JP Pub No. 11-074986.*

(Continued)

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

A communications device and method for transmitting e-mail with image data attached as an attachment file can select whether to send the e-mail directly to the recipient or via a mail server, depending on the address of the e-mail to be transmitted. As a result, the disclosed device and method can reduce the load on the mail server and transmit large volumes of data reliably.

8 Claims, 21 Drawing Sheets

(56) References Cited

U.S. PATENT DOCUMENTS

| | | |
|---|---|---|
| 6,880,019 B1 | 4/2005 | Toyoda |
| 7,119,915 B2 | 10/2006 | Tonegawa |
| 7,164,488 B2 | 1/2007 | Henry |
| 7,224,491 B2 * | 5/2007 | Shinchi et al. ............... 358/400 |
| 2001/0033390 A1 * | 10/2001 | Tonegawa .................... 358/1.15 |
| 2001/0054076 A1 | 12/2001 | Tonegawa |
| 2002/0004826 A1 * | 1/2002 | Waite et al. .................. 709/223 |
| 2002/0051222 A1 * | 5/2002 | Nishimura .................... 358/402 |
| 2002/0144026 A1 * | 10/2002 | Dunlap et al. ................. 710/16 |
| 2002/0194282 A1 * | 12/2002 | Saito et al. ................... 709/206 |
| 2003/0016283 A1 | 1/2003 | Leskanic |
| 2003/0078982 A1 * | 4/2003 | Ogawa ......................... 709/206 |
| 2003/0081591 A1 | 5/2003 | Cheung |
| 2004/0052433 A1 | 3/2004 | Henry |
| 2005/0235040 A1 | 10/2005 | Tonegawa |

FOREIGN PATENT DOCUMENTS

| | | | |
|---|---|---|---|
| JP | 11074986 | * | 3/1999 |
| JP | 2001-111628 | | 4/2001 |
| JP | 2001-111764 | | 4/2001 |
| JP | 2002-27193 | | 1/2002 |

OTHER PUBLICATIONS

"Email System Perfect Master, Chapter 3—System Management of UNIX Email", Open Design, CQ Publishing Co., Ltd., Jun. 1, 1997, vol. 8, 4th edition, p. 49.

Japanese Office Action dated Jan. 26, 2009 issued during prosecution of related Japanese application No. 2002-030918.

"Internet Email Protocols: A Development Guide", Addison Wesley Longman, Inc. 2000.

Balzer, R., "Assuring the safety of opening email attachments", Jun. 12-14, 2001, IEEE, vol. 2, pp. 257-262 (1-6).

Dura, K., "Proposal of Extensions to Electronic Mail Client Applications", Feb. 24-28, 2004, IEEE, pp. 357-359 (1-3).

M. Niizuma, "Mail", Network Magazine, Japan, ASCII Corp., Jul. 1, 2001, vol. 6, No. 7, pp. 84-91.

* cited by examiner

FIG. 8

| | | |
|---|---|---|
| | TRANSMISSION SETTINGS | |
| 300 — READ SIZE | AUTO | DETAILED SETTINGS |
| 301 — RESOLUTION | 200×200 dpi | 302 |
| 303 — ADDRESS | ifax@abc.co.jp | |
| 304 — SUBJECT | TEST | |
| 305 — BODY | HELLO | |
| 306 — SENDER | client@xyz.co.jp | |

FIG. 21

|  | DATE | REC. NO. | ADDRESS | MODE | RESULT |
|---|---|---|---|---|---|
| 850 | 10/31 15:00 | 0577 | ifax@abc.co.jp | Full | OK |
| 851 | 10/31 19:38 | 0578 | ifax@figaro2.xyz.co.jp | Full | OK |
| 852 | 10/31 19:39 | 0578 | ifax@figaro2.xyz.co.jp | Full | OK |
| 853 | 10/31 19:40 | 0578 | client@xyz.co.jp | Simple | -- |
| 854 | 10/31 21:08 | 0579 | ifax@xxx.co.jp | Full | -- |
| 855 | 10/31 21:10 | 0579 | abc@abc.co.jp | Full | NG |
| 856 | 11/01 9:03 | 0580 | ifax@abc.co.jp | Full | OK |
| 857 | 11/01 9:10 | 0581 | ifax@figaro2.xyz.co.jp | Full | OK |
| 858 | 11/01 9:10 | 0581 | ifax@abc.co.jp | Full | OK |
| 859 | 11/01 9:39 | 0582 | client@xyz.co.jp | Simple | -- |

FIG. 22

```
*********************************
***  TRANSMISSION RESULT REPORT  ***
*********************************
```

950
951  REC. NO.       0580
952  START TIME     11/01 09:03
     NO. OF PAGES   2

953
954  UNDELIVERED
955  DELIVERED      ifax@abc.co.jp  iFAX  (abc)
956  ERROR
     UNCERTAIN

957

ABC COMPANY, MR/MS ○△☐

XYZ COMPANY,
SALES DIV., MR/MS ○○××

ATTACHED IS THE ESTIMATE
YOU REQUESTED.

SINCERELY

COMMUNICATIONS DEVICE AND CONTROL METHOD FOR TRANSMITTING AN IMAGE BY ELECTRONIC MAIL

This application is a continuation of application Ser. No. 10/503,221, filed Aug. 2, 2004 now U.S. Pat. No. 7,697,171, which is a national stage application under 35 U.S.C. §371 of International Application No. PCT/JP03/01115, having an international filing date of Feb. 4, 2003, which claims priority to Japanese Application No. 2002-030918, filed on Feb. 7, 2002, the contents of each of which are incorporated by reference herein.

TECHNICAL FIELD

The present invention relates to a communications device and control method for transmitting an image by electronic mail (hereinafter e-mail), and more particularly, to a communications device and control method for transmitting image data as an e-mail attachment file.

BACKGROUND ART

In recent years, with the spread of personal computers and the rise of networks, e-mail for transmitting and receiving text data via such networks has become more common. With e-mail, it is possible to attach files of various types to the text-data body of the mail, so an Internet facsimile for transmitting and receiving image data via e-mail to which image TIFF (Tag Image File Format) files are attached has been proposed.

Similarly, with the RFC 2532 (Expanded Facsimile Using Internet Mail) issued by the IETF (Internet Engineering Task Force), an internet facsimile full mode has been proposed that notifies a sending device by e-mail that a receiving device has properly received an e-mail sent by the sending device when the receiving device has properly received an e-mail with an image TIFF file attachment transmitted by the sending device.

With this type of Internet facsimile, ordinarily, during the time it takes the image data transmitted from the sending device to reach the receiving device, the e-mail passes through a plurality of mail servers. As a result, delay in transmission can be a factor. Also, certain mail servers limit the size of the attached file in order to reduce the processing load at the server, and when such a mail server exists in the transmission route there is always a chance that a large file attachment might not be transmitted properly.

By contrast, in the case of a mail address existing in the same local environment, such as on the same network, there is no need for the e-mail to pass through a server, thus eliminating server-generated delays and errors in transmission.

Consequently, a communications device equipped with the capability to determine quickly and easily whether or not a given e-mail with attached image file is to be routed through a mail server depending on the address would be able to reduce the processing load on the mail server.

DISCLOSURE OF INVENTION

Accordingly, it is an object of the present invention to provide a communications device for transmitting image data as an e-mail attachment file that can determine quickly and easily whether or not a given e-mail with attached image file is to be routed through a mail server depending on the address and routes the e-mail accordingly, thus reducing the processing load on the mail server.

According to one aspect of the present invention, the above-described object is attained by a communications device comprising:

recipient data recording means adapted to recording data concerning a recipient;

e-mail data generating means adapted to generating e-mail having image data in an attachment file; and transmission means for transmitting the e-mail to a designated recipient, the recipient data recording means having transmission routing data that is set for each recipient, the transmission means, based on transmission routing data corresponding to the recipient of the e-mail to be transmitted, either transmitting the e-mail to the directly recipient or to a designated server.

According to another aspect of the present invention, the foregoing object is achieved by a method for controlling a communications device, the communications device having recipient data recording means adapted to recording data concerning a recipient, the method comprising the steps of:

generating e-mail having image data in an attachment file; and transmitting the e-mail to a designated recipient, the recipient data recording means having transmission routing data that is set for each recipient, the transmission step, based on transmission routing data corresponding to the recipient of the e-mail to be transmitted, either transmitting the e-mail to the directly recipient or to a designated server.

According to yet another aspect of the present invention, the foregoing object is achieved by a computer program for causing a computer to function as a communications device comprising:

recipient data recording means adapted to recording data concerning a recipient;

e-mail data generating means adapted to generating e-mail having image data in an attachment file; and transmission means for transmitting the e-mail to a designated recipient, the recipient data recording means having transmission routing data that is set for each recipient, the transmission means, based on transmission routing data corresponding to the recipient of the e-mail to be transmitted, either transmitting the e-mail to the directly recipient or to a designated server.

Other objects, features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention, in which:

FIG. 8 is a diagram showing a transmission setting screen of the communications device 100 of FIG. 1;

FIG. 21 is a diagram showing an example of a transmission result recorded at the communications device according to one embodiment of the present invention; and FIG. 22 is a diagram showing an example of a transmission result report output by the communications device according to one embodiment of the present invention.

BEST MODE FOR CARRYING OUT THE INVENTION

Preferred embodiments of the present invention will be described in detail, in accordance with the accompanying drawings.

Figure 1:
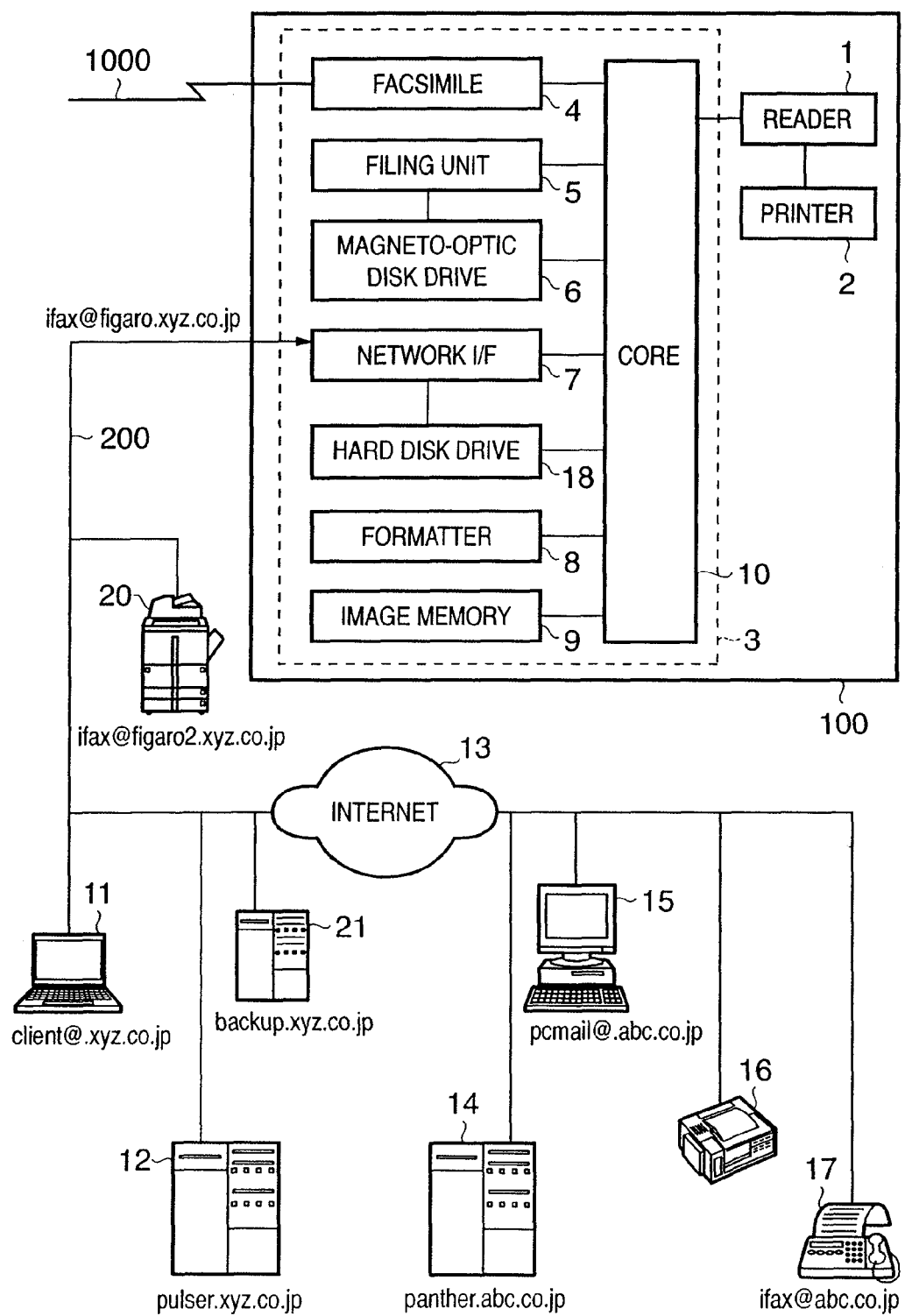
FIG. 1 is a block diagram of one configuration of a communications system using a communications device according to one embodiment of the present invention.

FIG. 1 is a block diagram of one configuration of a communications system using a communications device according to one embodiment of the present invention.

A communications device 100, as shown in FIG. 1, has a reader 1, a printer 2 and an image input-output controller 3. The reader 1 reads an image of a document and outputs image data corresponding to the read document image to the printer 2 and the image input-output controller 3. The printer 2 prints an image that corresponds to the image data from the reader 1 and an image input-output controller 3 onto a recording medium. The recording medium may be paper, film, or some other suitable material. The an image input-output controller 3 is connected to the reader, and is equipped with a facsimile 4, a file 5, a magneto-optic disk driver 6, a network I/F 7, a formatter 8, an image memory 9 and a core 10.

The facsimile 4 is a circuit that expands compressed image data received via a telephone line and forwards the expanded image data to the core 10, and also compresses image data sent from the core 10 and transmits the compressed image data to the telephone line.

The magneto-optic disk driver 6 is connected to the file 5. The file 5 compresses image data sent from the core 10 and writes the compressed image data together with keywords for searching the image data to a magneto-optic disk set in the magneto-optic disk driver 6.

The file 5 searches the compressed image data stored in the magneto-optic disk based on the keywords transmitted via the core 10, reads out and expands the searched compressed image data, and sends the expanded image data to the core 10.

The network I/F 7 has a network interface for connecting to the image input-output controller 3, and is assigned the e-mail address ifacsimile@figaro.xyz.co.jp.

A hard disk 18 is connected to the network I/F 7 and is capable of storing e-mail data received via a local network 200.

A communications device 20 like the communications device 100 is connected to the local network 200 and (the network I/F of) the communications device 20 is assigned the e-mail address ifacsimile@figaro02.xyz.co.jp. Also, a first server 12 that functions as a mail server, pop server and DNS server (with the e-mail address pulser.xyz.co.jp), a second server 21 having the same capabilities as the first server 12 for the purpose of backing up the first server 12 (and assigned the e-mail address backup.xyz.co.j), and a mail client PC11 assigned the e-mail address client@xyz.co.jp are connected to the network 200. The network 200 is in turn connected to the World Wide Web, or Internet 13, via, for example, a gateway device not shown in the diagram.

Inside the Internet 13 or an external network accessible via the Internet 13 are a plurality of mail servers like a third server 14 (assigned the e-mail address panther.abc.co.jp), thus enabling e-mail communication with a great many people.

The formatter 8 is a circuit that converts code data expressing an image sent from a computer connected to the network I/F 7 into image data that can be printed by the printer 2.

The image memory 9 is a circuit that temporarily stores image data.

A detailed description of the core 10 is given later. In general, the core 10 controls the flow of data at the reader 1, facsimile 4, file 5, network I/F 7, format 8, and image memory 9 blocks.

A description is now given of the process of attaching an image read by the reader 1 to an e-mail and transmitting it to a mail client 15 (e-mail address pcmail@abc.co.jp) in the present device.

In this case, the image read by the reader 1 is converted into an e-mail attachment file form and the data transmitted to the first mail server 12 using SMTP (Simple Mail Transfer Protocol). In this e-mail, the originating e-mail address is the ifacsimile@figaro.xyz.co.jp assigned to the network I/F 7.

Based on the designated mail client 15 e-mail address pcmail@abc.co.jp, the first mail server 12 transmits the data to the third mail server 14 via the Internet 13. The third mail server 14, having received the e-mail so sent, verifies that the address is the address of a user that it manages and saves the received e-mail in the mail box of the mail client 15.

E-mail software (that is, a mailer) that can send and receive e-mail is installed in the mail client 15, and checks the mailbox of the third server 14 for new mail at certain time intervals using POP3 (Post Office Protocol—Version 3), for example. If there is new mail, the new mail is downloaded and an image read by the reader 1 of the communications device 100 can be obtained as an attachment file.

Similarly, when sending image data to an internet facsimile 17 (e-mail address ifacsimile@abc.co.jp), it is possible to send the data via the first server 12, the internet 13 and the third server third server 14, with the internet facsimile 17 that receives the image data printing the received image data.

The reverse is also possible. That is, it is possible to send image data read by the Internet facsimile 17 to the communications device 100 via the third server third server 14, the Internet 13 and the first server 12. At the communications device 100, the received image data can be printed by the printer 2.

Figure 2:
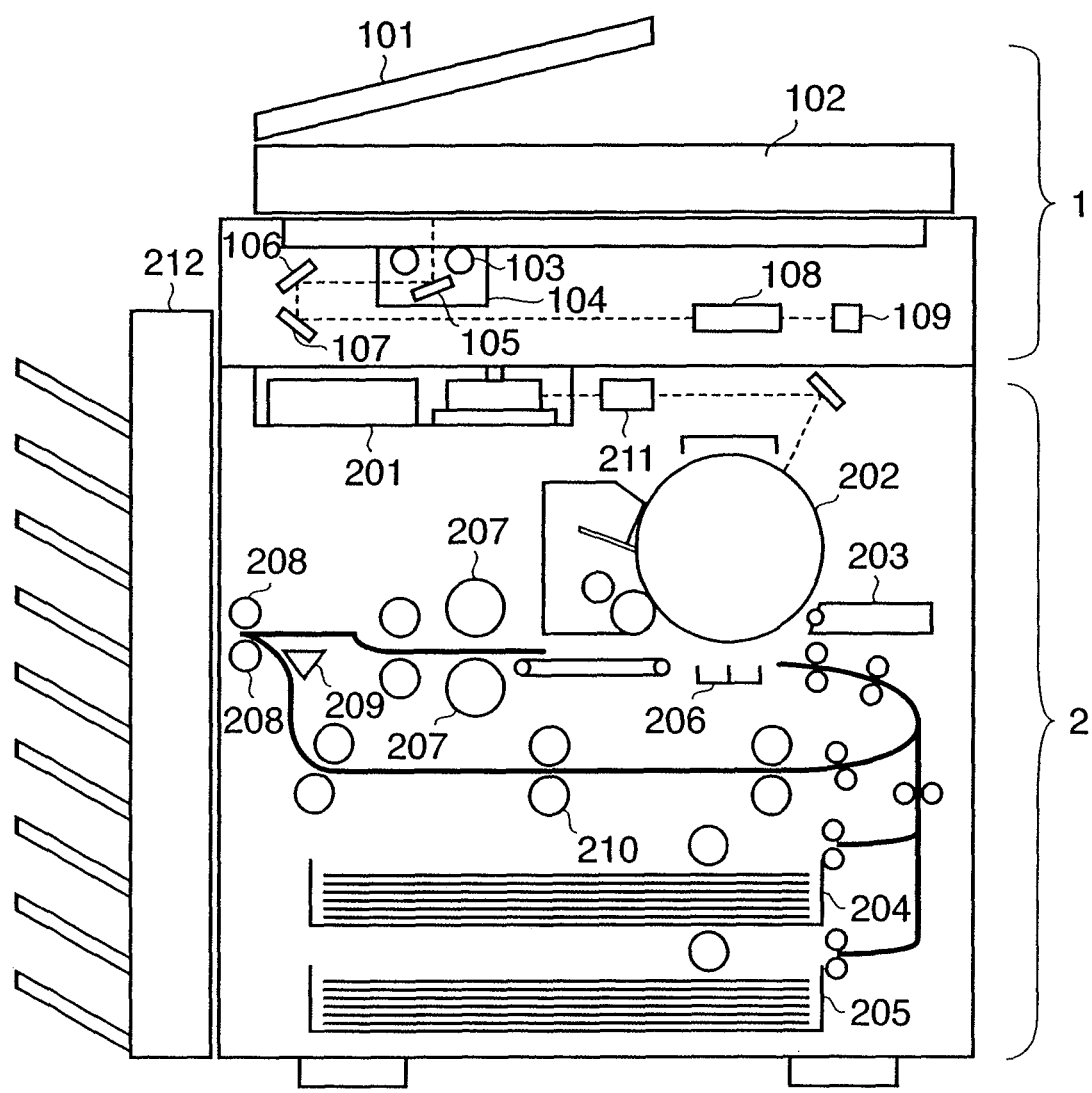
FIG. 2 is a cross-sectional view of a copier as one type of the communications device 100 of FIG. 1.

FIG. 2 is a cross-sectional view of a copier as one type of the communications device 100 of FIG. 1.

As shown in the diagram, a document feeder 101 is mounted in the reader 1. The document feeder 101 feeds a document set thereat, one sheet at a time, to a position atop a platen glass 102, and removes the sheet from the platen glass 102 when reading is completed.

When a document is transported to the platen glass 102, a lamp 103 is lit and a scanner unit 104 begins to move. This movement of the scanner unit 104 results in the document being scanned, and the light reflected from the document during such scanning is conducted to a CCD image sensor 109 (hereinafter simply CCD 109) via mirrors 105, 106 and 107 and a lens 108.

The light reflected from the scanned document is read by the CCD 109 to photoelectrically convert the optically read image into image data that it then outputs. The image data output from the CCD 109, after certain processing, is then forwarded to the printer 2 and to the core 10 (not shown in the diagram) of the image input-output controller 3 (not shown in the diagram) via a video bus (not shown in the diagram).

At the printer, the image data output from the reader 1 is input to a laser driver 201. The laser driver 201 drives a laser emitter 211 according to the input image data. In other words, the laser drive 201 drives the laser emitter 211 in such a way as to emit a laser beam corresponding to the image data output from the reader 1. This laser beam is directed onto a photosensitive drum 202 by a polygon mirror or the like (not shown in the diagram). By successively scanning the photosensitive drum 202 with the laser beam emitted by the laser emitter 211 while rotating the photosensitive drum 202, an electrostatic potential image is formed on the photosensitive drum 202 corresponding to the laser beam.

This electrostatic potential image on the photosensitive drum 202 is made visible as a developed image by a developing agent supplied from a developer unit 203. Recording paper is supplied from one or the other of either cassette 204 or cassette 205 in synchrony with the emission of the laser to a position between the photosensitive drum 202 and a transfer unit 206. The developed image formed on the photosensitive drum 202 is then sent to the recording paper by the transfer unit 206.

The recording paper, to which the developed image is sent, is conveyed to a fixer 207, where the recording paper is heated and pressed so as to fix the developed image. The recording paper then passes through the fixer 207 and is delivered by an exit roller 208 to a sorter 212 that sorts the printed paper into various bins for storage until retrieval. It should be noted that, when the sorter 212 is not set to sort, the recording paper is stored in the uppermost bin. In addition, when set to double-sided printing, the exit roller 208 is rotated in reverse after the recording paper is transported to the exit roller 208, and the paper is led to a re-supply route having a second transport roller 210 led by a flapper 209.

When set to multi-printing, the flapper 209 is switched so that the recording paper is not transported to the exit roller 208 but is instead led to the re-supply route described above, where the paper is again fed between the photosensitive drum 202 and the transfer unit 206.

A description is now given of an example of a configuration of the reader 1.

Figure 3:
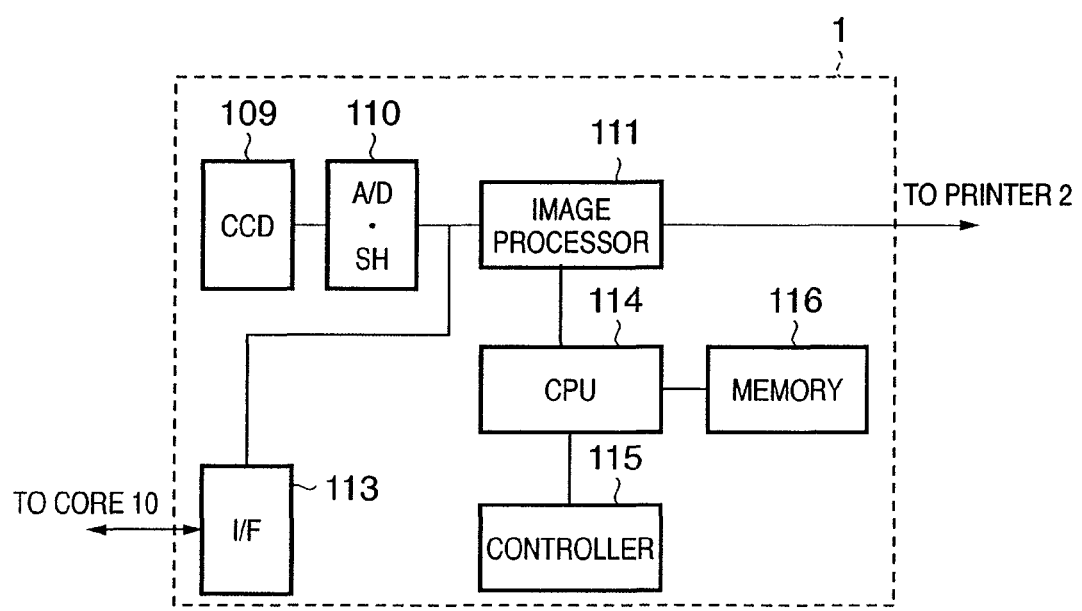
FIG. 3 is a block diagram of a configuration of the reader 1 of FIG. 2.

FIG. 3 is a block diagram of a configuration of the reader 1 of FIG. 2.

The image data output from the CCD 109, as shown in FIG. 3, is converted from analog to digital data by an A/D SH 110 and is also shading corrected. The image data so processed is then sent both to the printer 2 via an image processor 111 as well as to a the core 10 of the image input-output controller 3 via the I/F 113. The image processor 111 processes the image using a variety of processes, including trimming. The I/F 113 takes in data including image data sent from the core 10 and controls the interface with the core 10.

The image processor 111 and the I/F 113 are controlled by a CPU 114 according to settings input via key and touch-panel provided on a controller 115. For example, when the controller is set to a photographic mode so as to trim and photograph, the CPU 114 trims the image data using the image processor 111 and sends the trimmed image data to the printer 2.

Similarly, when the controller is set to facsimile transmission mode, the CPU 114 sends control commands from the I/F 113 to the core 10 according to the image data and the set mode.

The control exerted by the CPU 114 is performed by the CPU 114 executing a control program stored in the memory 116, for example. In addition, the memory 116 can also be used as a CPU 114 work area.

A description is now given of an example of a configuration of the core 10.

Figure 4:
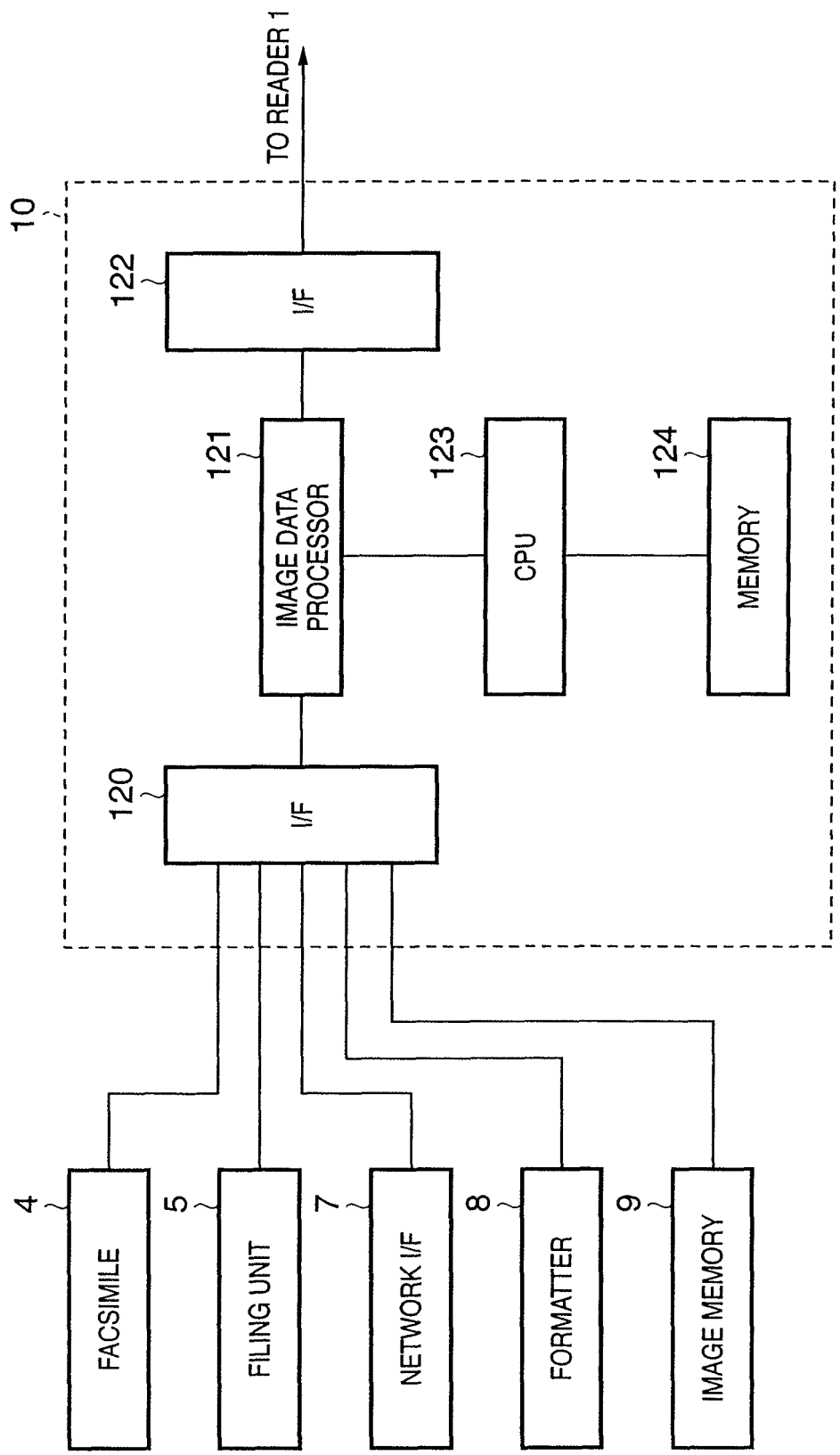
FIG. 4 is a block diagram of a configuration of the core 10 of FIG. 1.

FIG. 4 is a block diagram of a configuration of the core 10 of FIG. 1.

The core 10 has an interface I/F 22 with the reader 1 (hereinafter reader I/F 22), so image data sent from the reader 1 is transmitted to an image data processor 121 via the reader I/F 22. Also, control commands from the reader 1 are similarly transmitted to the CPU 123 via the via the reader I/F 22. The image data processor 121 processes the image data in a variety of ways as necessary. Such processes include, but are not limited to, rotating the image as well as enlarging or reducing it. The image data processed at the image data processor 121 is then sent to either the facsimile 4, the file 5 or the network I/F 7 via the I/F 120, depending on the control commands sent from the reader 1.

The printer data that expresses the image input from the network I/F 7, after being sent to the image data processor 121, is then sent to the formatter 8 and expanded into image data where it is once again sent to the image data processor 121, after which the image data is then sent to either the facsimile 4 or to the printer 2 via the I/F 122. The image data received at the facsimile 4 is then forwarded to the image data processor 121, after which it is then sent to either the facsimile 4, the file 5 or the network I/F 7. The image data output from the file 5, after being sent to the image data processor 121, is then sent to either the printer 2, the facsimile 4 or the network 7.

Based on the control commands sent from the reader 1, for example, the CPU 123, by executing the control program stored in the memory 124, controls the transfer of data between blocks and at the same time controls the execution of image processing by the image data processor 121. The memory 124 can also be used as a CPU 123 work area.

Thus, as described above, a multiplicity of function can be carried out simultaneously by the core 10, including document image reading, printing of an image, image transmission and reception, image storage, and input and output of data from a computer.

A description is now given of an example of a configuration of the formatter 8.

Figure 5:
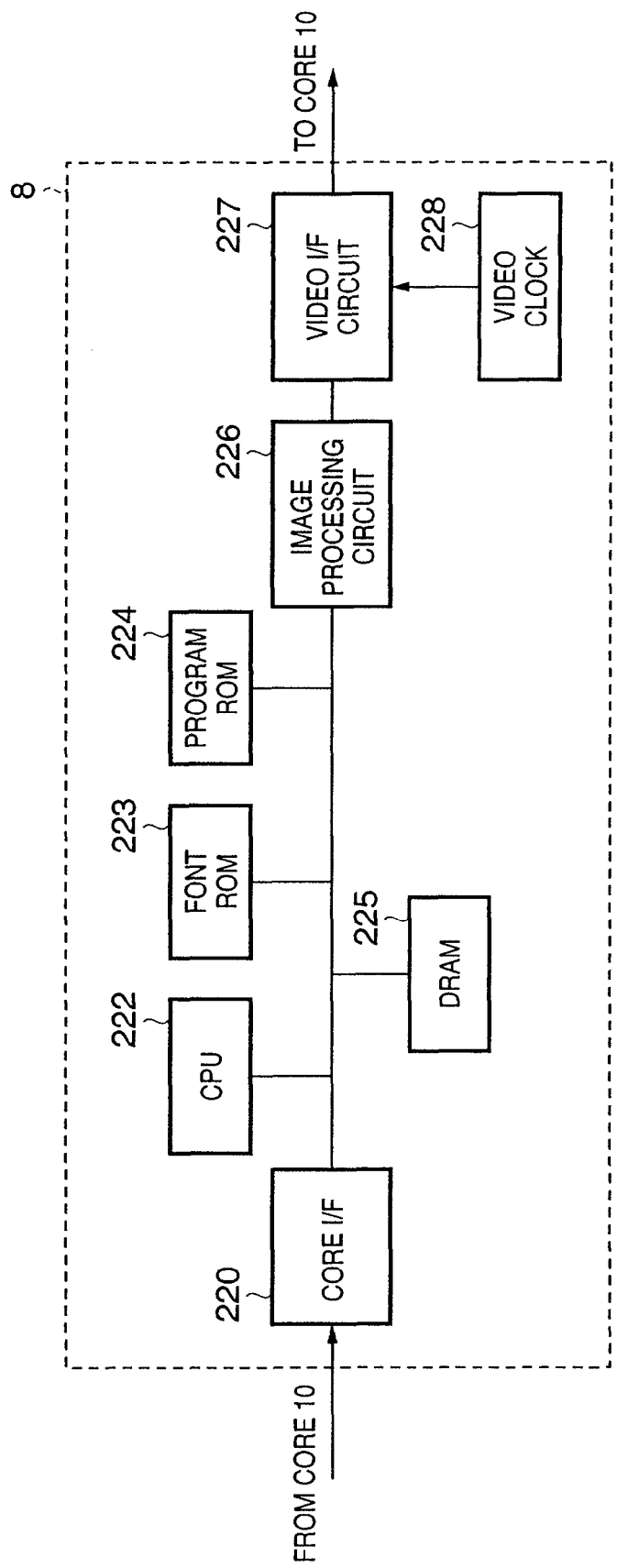
FIG. 5 is a block diagram of a configuration of the formatter 8 of FIG. 1.

FIG. 5 is a block diagram of a configuration of the formatter 8 of FIG. 1.

Data produced using an application such as a word processing program of a PC client server 11 is converted by the printer driver into a Page Description Language (PDL) such as Postscript (PS) or the like that is printable by the printer. The converted data is then sent to the formatter 8 via the network I/F 7 and the core 10.

At the formatter 8, the data is received via a core I/F 220 and interpreted by a CPU 222. The CPU 222 generates image data using a Font ROM 223 and Dram 225. The image data so generated is then further processed by an image processing circuit 226, synchronized with a sync signal generated by a video clock 228 and then sent to the core 10 from a video I/F circuit 227. The sent image data is then printed by the printer 2.

Thus, as described above, printing is performed based on the PDL. The CPU 222 may, for example, control the operations of the formatter 8 as a whole by executing a control program stored in the ROM 224.

It should be noted that the formatter 8 can be changed with each type of PDL. The ROM 224 version differs according to the PDL type, so the user can select the PDL and version according to his or her purpose.

A description is now given of an example of a configuration of the facsimile 4.

Figure 6:
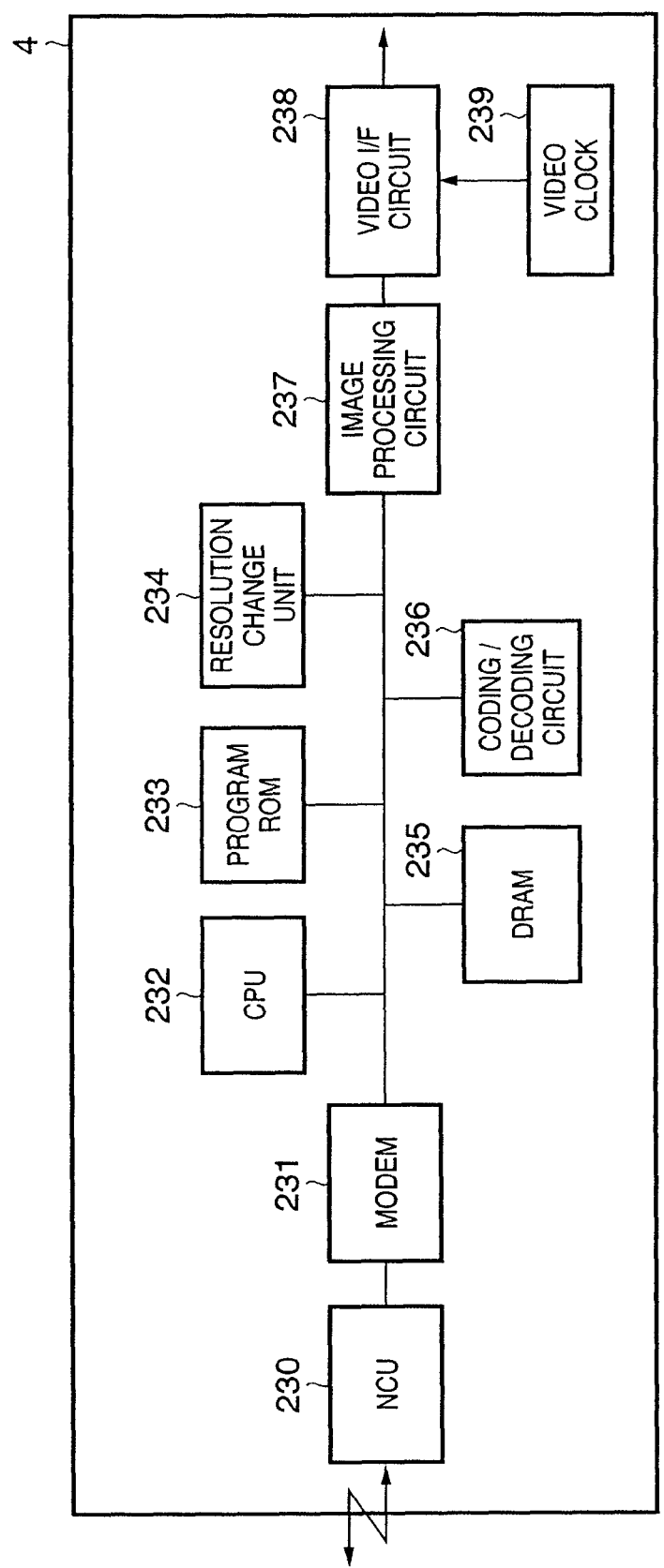
FIG. 6 is a block diagram of a configuration of the facsimile 8 of FIG. 1.

FIG. 6 is a block diagram of a configuration of the facsimile 8 of FIG. 1.

The NCU (Network Control Unit) 230 is a circuit that connects the facsimile 4 to the telephone, and performs switching between telephone and facsimile functions, detection of a call signal upon reception and holds a DC loop signal from the telephone exchange during a call.

A MODEM (MOdulator/DEModulator) 231 is a modulation-demodulation circuit that converts analog signals into digital signals and, conversely, digital signals into analog signals.

Data sent from another facsimile is received by the NCU 230 and converted into digital signals by the MODEM 213. The data is image data that has been encoded using either the MH, MR, MMR or JBIG encryption method.

The data so sent is decoded by a coding/decoding circuit 236 and expanded into image data at a DRAM 235. The resolution of the resulting image is then changed by a resolution change unit 234 and the image is processed at an image processing circuit 237. The resulting image data is synchronized with a clock generated by a video clock 239 and sent to the core 10 by a video I/F circuit 238, where it is printed by the printer 2.

During transmission, image data read by the reader 1 is expanded to the DRAM 235 by the video I/F circuit 238, the video clock 239 and the image processing circuit 237 via the core 10. The resolution of the data is then changed by the resolution change unit 234 and encoded by the coding/decoding circuit 236 using the either the MH, MR, MMR or JBIG method. The coded data is then converted into analog signals by the MODEM 231 and transmitted by the NCU 230.

The CPU 232 is a circuit that coordinates the above-described control. The program ROM 233 contains a program for operating the CPU 232. The facsimile 232 is detachable, and can be attached as needed.

Figure 7:
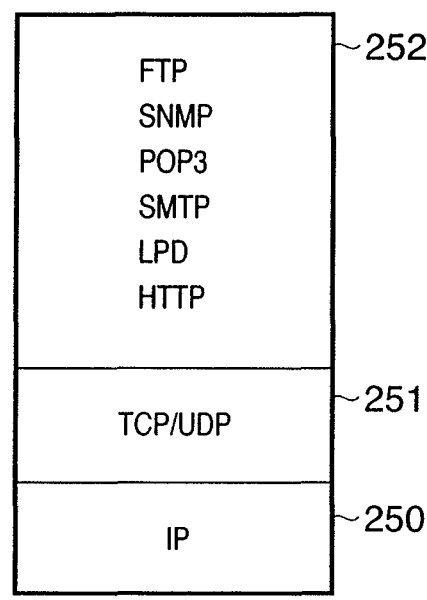
FIG. 7 is a block diagram of a program configuration of the network interface (I/F) 7 of FIG. 1.

Next, a description is given of the program structure in the network I/F 7, with reference initially to FIG. 7.

FIG. 7 is a block diagram of a program configuration of the network interface (I/F) 7 of FIG. 1.

As shown in FIG. 7, the network I/F 7 programs consist of programs that implement an IP (Internet Protocol) 250, a TCP (Transmission Control Protocol)/UDP (User Datagram Protocol) 251 and an application layer protocol 252.

The IP 250 is an Internet protocol layer that provides a service for delivering messages from a sending host device to a receiving host device by linking up with intermediate notes such as routers. The most important pieces of information for delivering a message is the sending address and the receiving address, which are managed by the IP 250. The IP 250 determines the routing of the message, that is, which paths the message will take inside the network in order to reach its intended destination address.

The TCP/UDP 251 is a transport layer that provides a service for delivering messages from a sending application process to a receiving application process. The TCP is a connection type service, and guarantees a high degree of transmission reliability, whereas the UDP, though also a connection type service, does not guarantee reliability.

The application layer protocol 252 regulates a plurality of protocols, including: File Transfer Protocol (FTP); Simple Network Management Protocol (SNMP); LPD, which is a printer server protocol; HyperText Transport Protocol (HTTP), which is a World Wide Web (WWW) server protocol; Simple mail Transfer Protocol (SMTP), which is an e-mail transmission and reception protocol; and Post Office Protocol version 3 (POP), which is an e-mail download protocol.

FIG. 8 is a diagram showing a transmission setting screen of the communications device 100 of FIG. 1, that is, an example of a display screen at the controller 115 when sending an image. It should be noted that, in the present example, the controller 115 is assumed for purposes of explanation only to be a touch-panel LCD display, and other types of controllers are of course possible.

The read size designated area 300 is the space for specifying the paper size of the image to be read by the scanner unit 104. The user can select, for example, from among paper sizes A5, A4, A3, B5, B4 and AUTOMATIC. The default setting is AUTOMATIC.

The resolution designation area 301 is the space for specifying the scanner unit 104 read resolution (dots/inch). Thus, for example, the user can select from among resolutions of 200×100, 200×200, 200×400, 300×300, 400×400 and 600× 600 dpi. The default setting is 200×200 dpi.

pressing the detail setting button 302 displays a window (not shown in the diagram) for specifying the read density, document type, two-sided read, page transfer, picture adjustment and so on, allowing the user to set any desired parameter.

Figure 9:
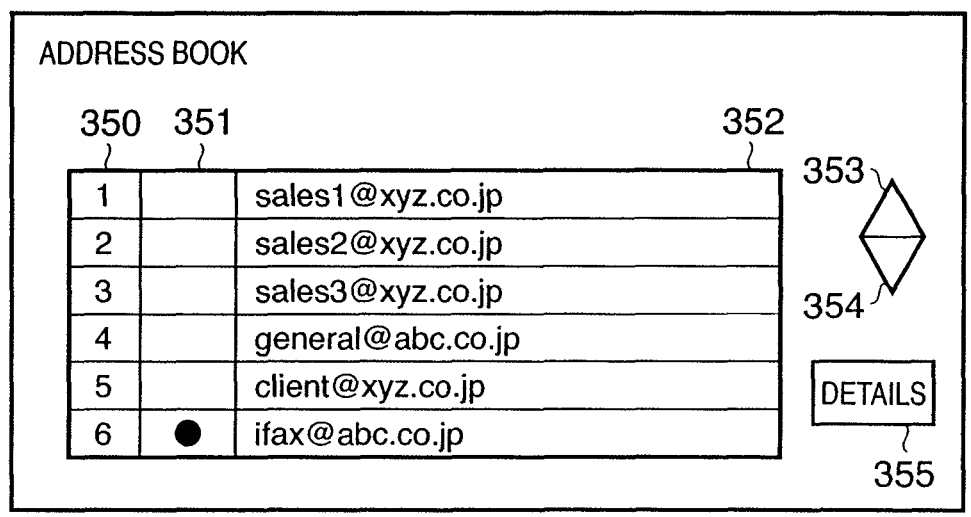
FIG. 9 is a diagram showing an address book selection screen of the communications device 100 of FIG. 1.

The recipient address designation area (or button) 303 is the space for inputting the address of the intended recipient of the e-mail. Pressing the "Address" button causes an address book like that shown in FIG. 9 to be displayed. The user can select a desired address from the address book and enters it in the recipient address designation area. A more detailed description of the address book, with reference to FIG. 9, is deferred. In FIG. 8, the address ifax@abc.co.jp of the Internet FAX 17 is designated as the address.

The subject matter specification area 304 is the space for giving a title to the e-mail. The text area 305 is the area in which the body of the message can be input. In FIG. 8, the subject of the e-mail is "TEST" and the body consists of the message "HELLO".

The reply designation area 306 is the space for designating "reply to sender" as the header when the user wishes to separately designate a reply-to-sender mail address, that is, when the user wishes to reply to the sender of the e-mail. FIG. 8 shows an example in which the e-mail address (client@xyz.co.jp) that the user himself or herself usually uses, and not the e-mail address of the Internet FAX machine (ifax@abc.co.jp), is specified as the sender's e-mail address. It should be noted that a reply-to-sender e-mail address can also be input using the address book.

When a reply-to-sender is selected as the e-mail address, it is possible to specify that a confirmation of communication be sent to both the e-mail address of the device (that is, to ifax@abc.co.jp) and to the reply-to-sender (i.e., the sender's) e-mail address. Accordingly, if the reply-to-sender e-mail address is set as the usually used e-mail address, the confirmation of communication can be sent to the client@xyz.co.jp as well, with ease.

FIG. 9 is a diagram showing an address book selection screen of the communications device 100 of FIG. 1. The address book can be edited in a user mode (not shown in the diagram), and serves as a database capable of storing a great many Internet FAX and individual e-mail addresses.

The address book consists of an address book ID field 350, a selection mark field 351 and an intended recipient e-mail address field 352, and can be scrolled up and down using keys 353, 354.

One or more addresses can be selected from the address book when sending an e-mail, with a selection mark appearing in the selection mark field(s) 351 corresponding to the to the selected address(es). FIG. 9 shows an instance in which address book ID No. 6, ifax@abc.co.jp, is selected as the address for the e-mail to be sent. Selection of an address can be accomplished by pressing the desired address with a finger.

The details display button 355 is the button for displaying detail information added to the selected address and registered. Such details may, for example, include the items shown in FIG. 10.

Figure 10:
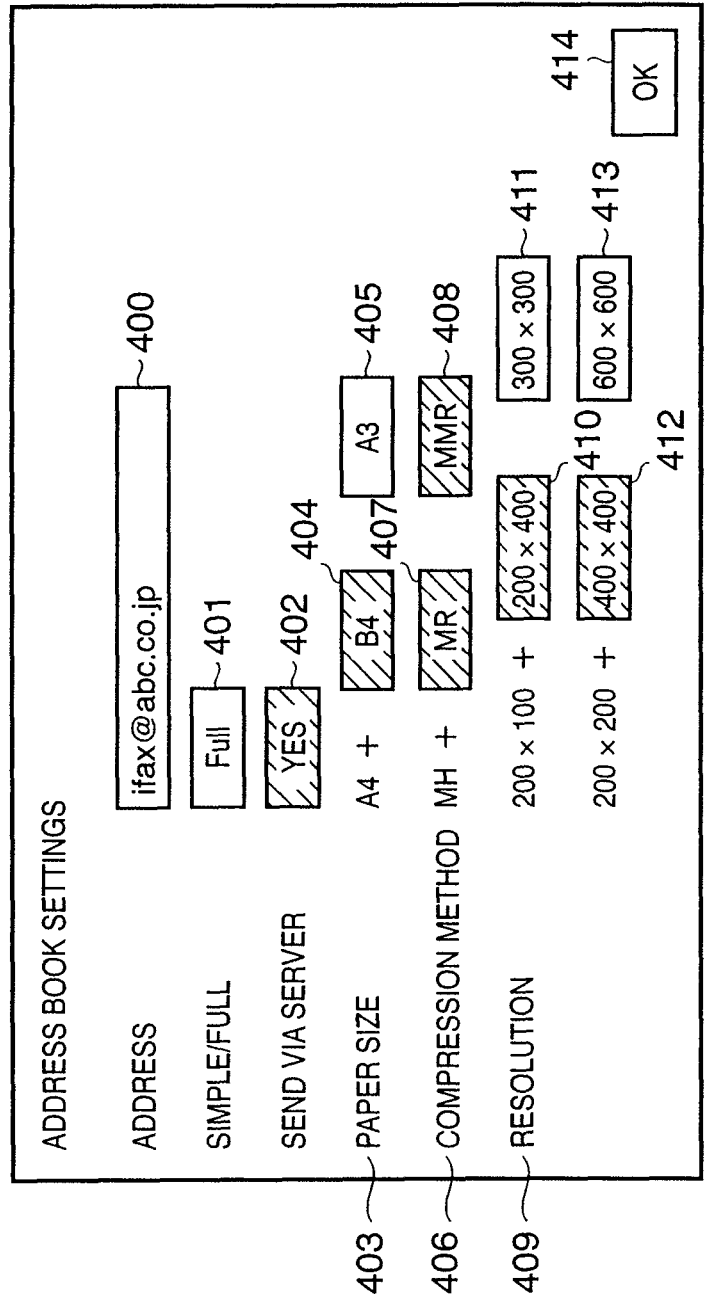
FIG. 10 is a diagram showing a screen for entering a name in the address book of the communications device 100 of FIG. 1.

FIG. 10 is a diagram showing a screen for entering a name in the address book of the communications device 100 of FIG. 1. Such a screen can be called up using a user mode that is not shown in the diagram as well as by pressing the details display button 355 in the address book display screen.

The address designation area 400 is the part for inputting the e-mail address of the intended recipient. By touching this area, for example, a virtual keyboard screen is displayed, and by using this virtual keyboard the user can input the e-mail address.

Reference numeral 401 denotes a mode switching button, which allows the user to select between a Simple Mode transmission, in which a confirmation is not undertaken with the transmission, and a Full Mode, in which a confirmation is undertaken. The mode switches each time this button is pushed.

Reference numeral 402 denotes a route selection button, allowing the user to select whether to send data via an e-mail server such as the mail server 12 or to send data directly without going through an e-mail server. The path setting changes each time the button is pressed. The user can determine which route to select by considering, for example, the network structure.

Reference numeral 403 denotes the paper size designation area, reference numeral 406 denotes the compression method selection area, and reference numeral 409 denotes the resolution selection area. Together, these areas set the range of the image data that can be received at the communications device 100. If the receiver can receive a B4-size image, the user sets the paper size designation area B4 button to ON. If the receiver can receive a A3-size image, the user sets the paper size designation area A3 button to ON. It should be noted that A4 (A4+) is a size that all facsimile machines can receive, and so the A4 button is always left ON.

In the event that the receiver can receive images compressed using the MR compression method, the user sets the compression method selection area 406 MR button 407 to ON. Similarly, if the receiver can receive images compressed using the MMR compression method, the user sets the compression method selection area 406 MMR button 408 to ON. images compressed using the MH compression method can be received by all facsimile machines, and so the MH (MH) button is always left ON.

If the receiver can receive images having a resolution of 200×400 dpi, the user sets the 200×400 button 410 to ON. Similarly, if receiver can receive images having a resolution of 300×300 dpi, 400×400 dpi or 600×600 dpi, as the case may be, the user accordingly sets a 300×300 dpi button 411, a 400×400 dpi button 412 or a 600×600 dpi button 413, respectively, to ON as appropriate. Images having resolutions of 200×100 dpi or 200×200 dpi can be received by all facsimile machines, so these setting are always left ON.

Reference numeral 404, 405, 407, 408, 410, 411, 412 and 413 denote buttons that, when ON, display a black background, and function as toggle switches in that they turn ON or OFF each time they are pressed.

Reference numeral 411 denotes an OK button, which, when pressed, enters the settings into the address book.

A description is now given of the process of producing image data according to the reception capabilities of the communications device 100 when transmitting an image read by the reader 1 in the communications device 100, with reference to FIGS. 11-14.

Figure 11:
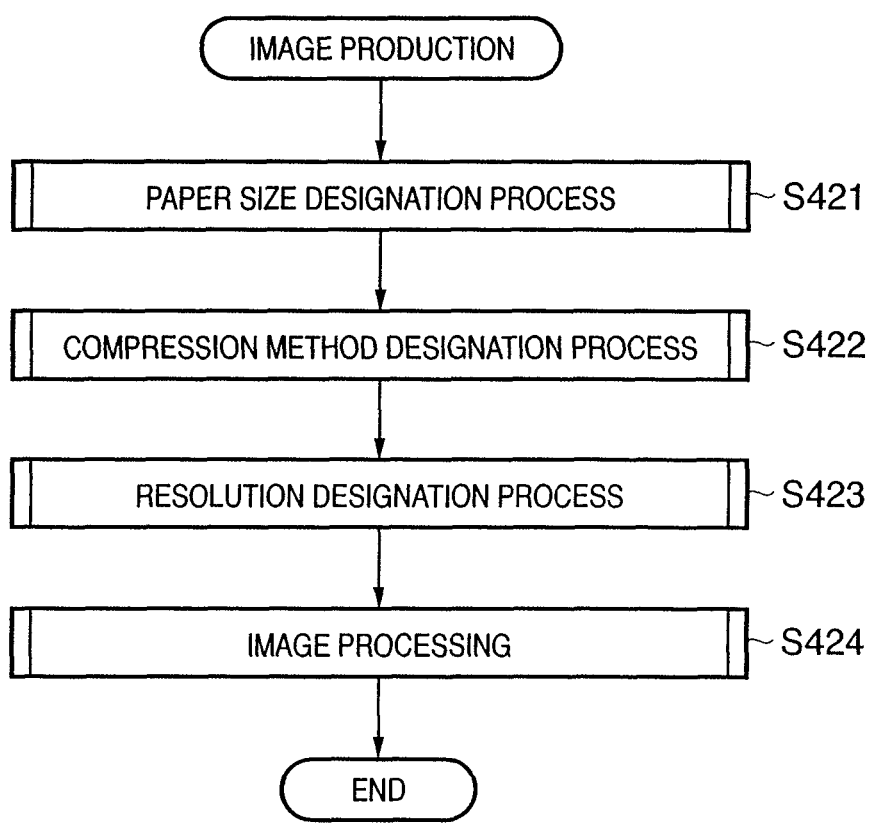
FIG. 11 is a flow chart illustrating the process of creating an image in the communications device according to one embodiment of the present invention.
Figure 12:
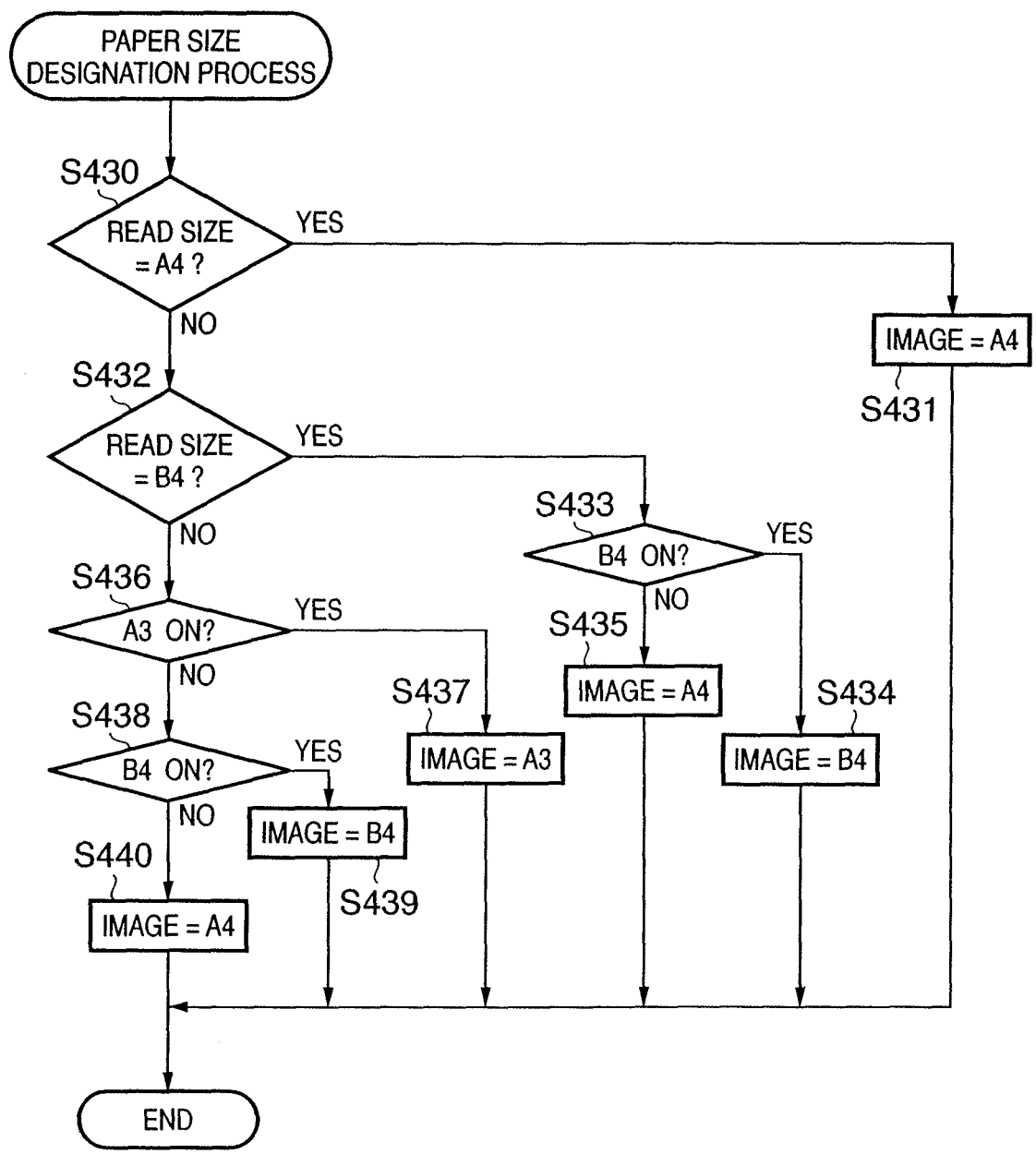
FIG. 12 is a flow chart illustrating the process of setting the size of the paper used in transmission of the communications device according to one embodiment of the present invention.
Figure 13:
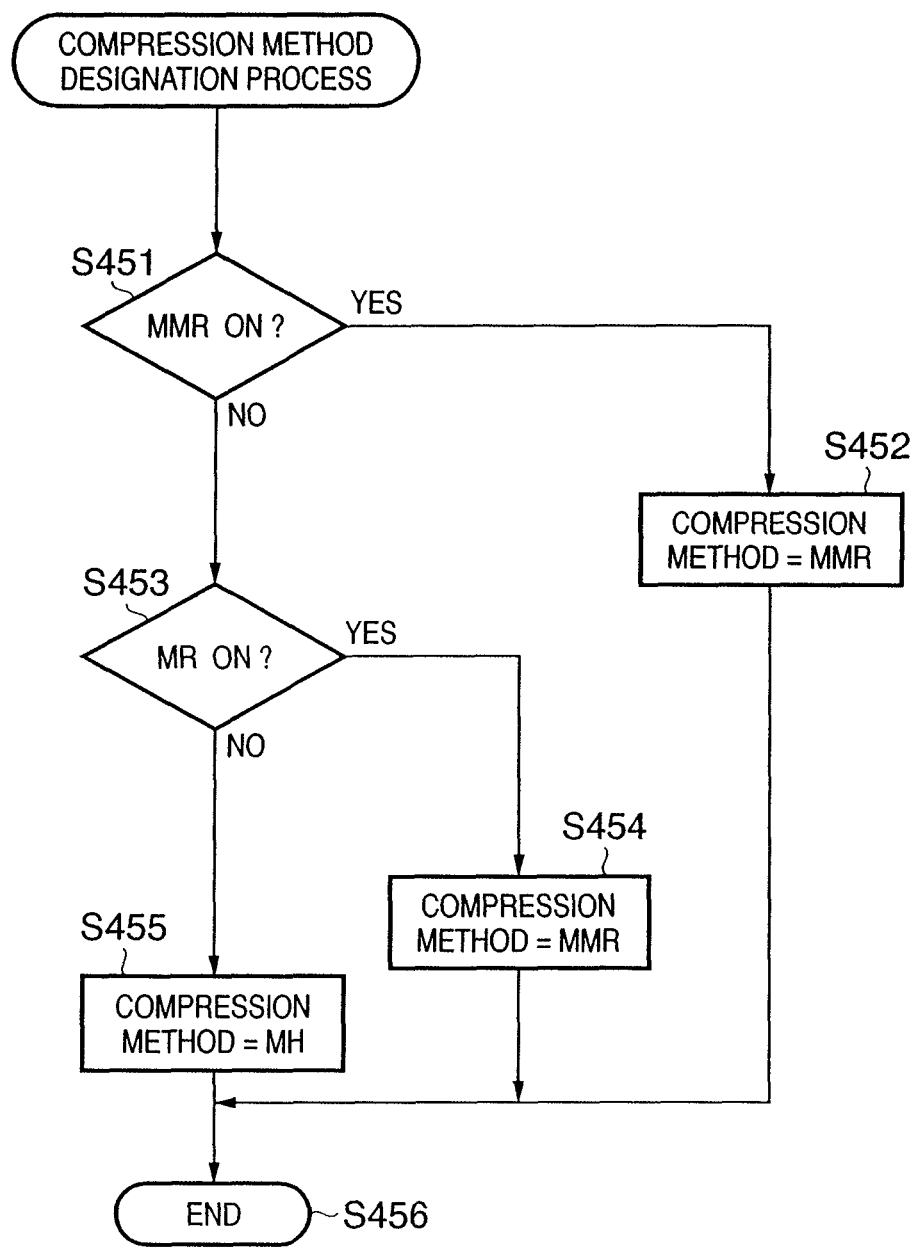
FIG. 13 is a flow chart illustrating the process of setting the compression method of the communications device according to one embodiment of the present invention.
Figure 14A:
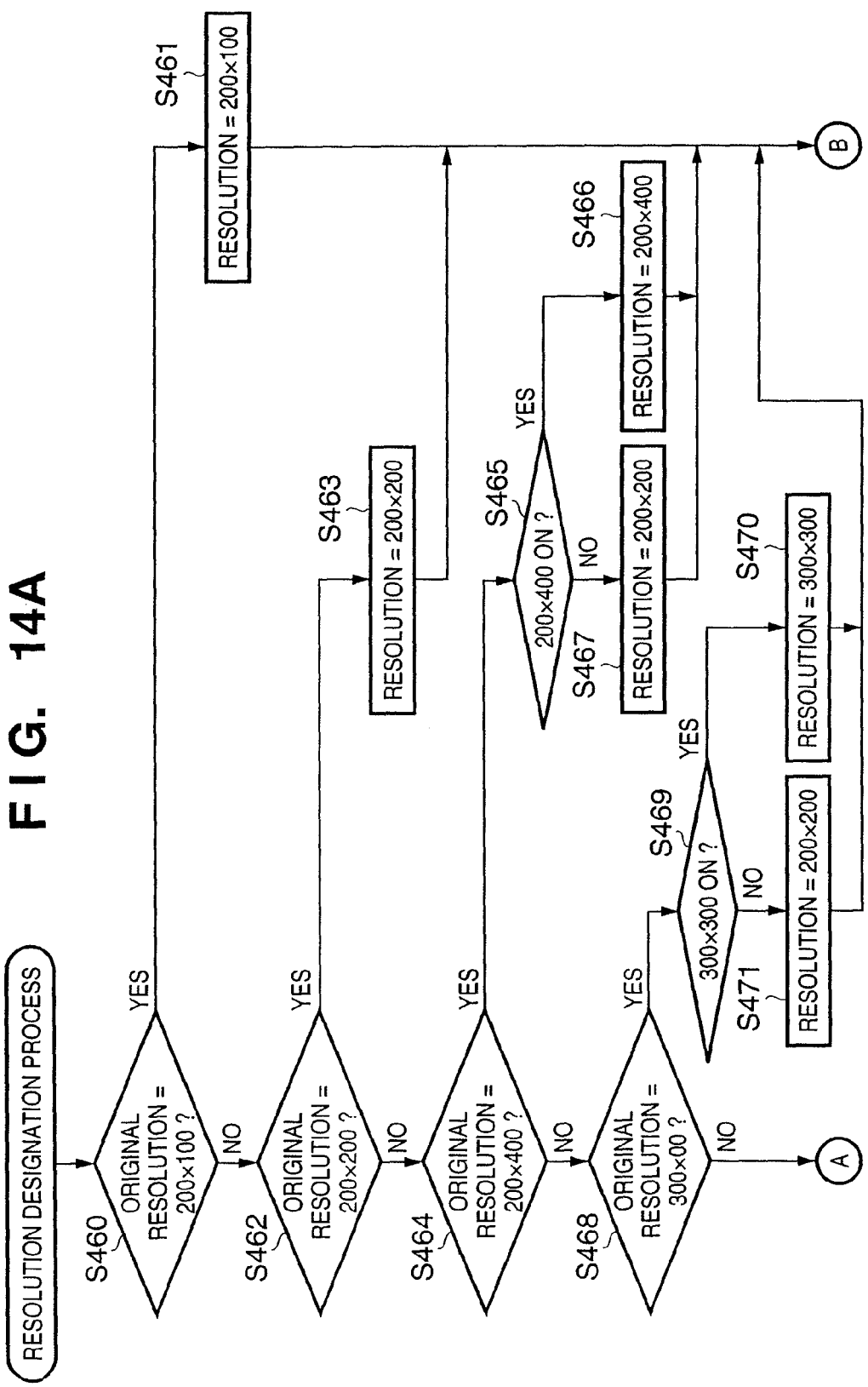
FIGS. 14A and 14B are flow charts illustrating the process of setting the resolution of the communications device according to one embodiment of the present invention.
Figure 14B:
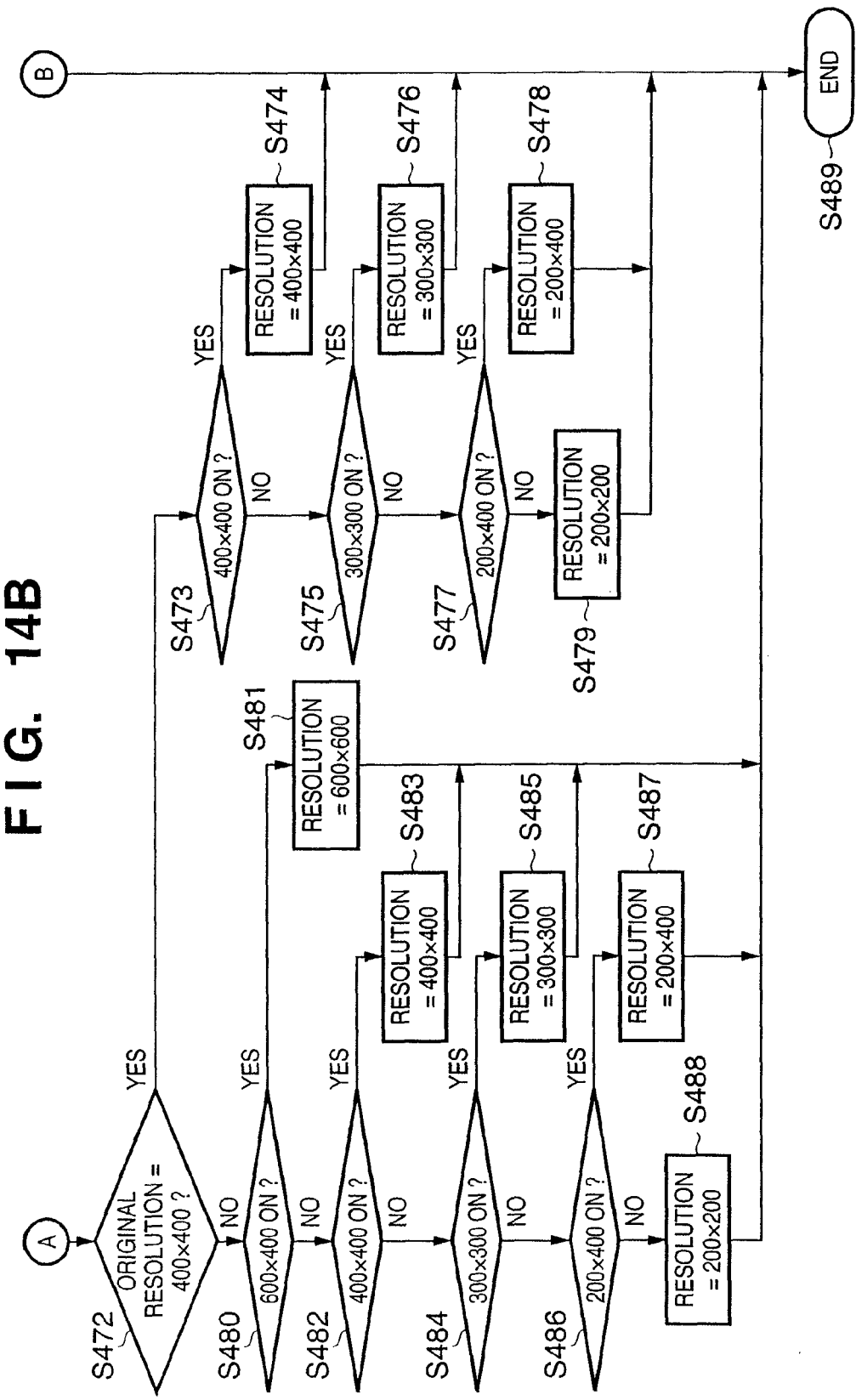

FIG. 11 is a flow chart illustrating the process of creating an image in the communications device according to one embodiment of the present invention. FIG. 12 is a flow chart illustrating the process of setting the size of the paper used in transmission of the communications device according to one embodiment of the present invention. FIG. 13 is a flow chart illustrating the process of setting the compression method of the communications device according to one embodiment of the present invention. FIGS. 14A and 14B are flow charts illustrating the process of setting the resolution of the communications device according to one embodiment of the present invention.

For clarity, a description is first given of the overall processing flow, using FIG. 11.

As shown in the diagram, the process involves producing image conversion parameters such as paper size designation (in a step S421), compression method designation (in a step S422) and resolution designation (in a step S423), and using these parameters to execute image conversion (in a step S424).

Next, a detailed description is given of the process of designating the size of the paper (step S421 in FIG. 11), using the flow chart shown in FIG. 12.

Initially, in a step S430, a determination is made as to whether or not the size of the original, pre-conversion image, that is, either the image read by the reader or the image received or forwarded via the network I/F 7, is A4.

If the size of the original, pre-converted image is found to be A4, then the image size is set to A4 in a step S431 and the process terminates. If, however, the size of the original, pre-converted image is found to be not A4, then in a step S432 a determination is made as to whether or not the read or received image size is B4, and, if so, then a determination is made in a step S433 whether or not the B4 paper size setting is ON or not (that is, whether the address book button 404 (B4 reception enabled) is ON or not. If the B4 setting is ON, then the image size is set to B4 in a step S434 and the process terminates.

If in step S433 the B4 setting is not ON, then the B4 size is set to be converted to A4 and the process terminates.

If, however, the read image size is neither A4 nor B4 but is instead A3, a determination is made in a step S436 as to whether or not the A3 paper size setting is ON, and, if so, then in a step S437 the image size is set to A3 and the process terminates.

If in step S436 the A3 setting is not ON, then in a step S438 a determination is made as to whether or not the B4 size setting is ON (that is, the address book button 404 (B4 reception enabled) is ON), and, if so, then in a step S439 the A3 image is set to convert to B4. If the B4 setting is not ON, then in a step S440 the A3 image is set to be converted to A4.

A detailed description is now given of the process of compressing the image, with reference to FIG. 13.

In a step S451, it is determined whether or not the MMR button 408 is ON, and, if, so, in a step S452 the compression method is set to MMR and the process terminates.

If, however, the MMR button 408 is not ON, then in a step S454 it is determined whether or not the MR button 407 is ON. If so, the compression method is set to MR in a step S454. If the MR button 407 is not ON, the compression method is set to MH in a step S455.

A detailed description is now given of the process of specifying the resolution of the image (step S423 in FIG. 11), with reference to FIGS. 14A and 14B.

In a step S460, a determination is made as to whether or not the resolution of the original image to be converted is 200× 100 dpi. If so, then in a step S461 the resolution is set to a magnification of 200×100 dpi and the process terminates.

If, however, the resolution of the original image to be converted is found in step S460 to be not 200×100 dpi, in a step S462 a determination is made as to whether or not the resolution is 200×200 dpi. If so, then in a step S463 the resolution is set to 200×200 dpi and the process terminates.

If, however, in step S462 it is determined that the resolution of the original image to be converted is not 200×200 dpi, in a step S464 a determination is made as to whether or not the resolution of the original image to be converted is 200×400 dpi, and, if so, in a step S465 a determination is made as to whether or not the 200×400 dpi button 410 is ON. If the 200×400 dpi button 410 is ON, the resolution is then set to a magnification of 200×400 dpi in a step S466, and if not ON, the resolution is set to 200×200 dpi and the process terminates.

If in step S464 the resolution of the original image is found to be not 200×400 dpi, in a step S468 a determination is made as to whether or not the resolution of the original image is 300×300 dpi, and, if so, then a determination is made in a step S469 if the 300×300 dpi button 411 is ON. If the button 411 is ON, then in a step S470 the resolution is set to a magnification of 300×300 dpi. If the button 411 is not ON, then the resolution is set to 200×200 dpi and the process terminates in a step S471.

In step S468 above, if the resolution of the original image is found to be not 300×300 dpi, then in a step S472 a determination is made as to whether or not the resolution of the original image is 400×400 dpi), and if so, in a step S473 a determination is made as to whether or not the 400×400 dpi is button 412 is ON. If button 412 is ON, the resolution is set to a magnification of 400×400 dpi in a step S474 and the process terminates.

If, however, button 412 is not ON, then in a step S475 a determination is made as to whether or not the 300×300 dpi button 411 is ON. If button 411 is ON, in a step S476 the resolution is set to 300×300 dpi and the process terminates.

If the 300×300 dpi button 411 is not ON, in a step S477 a determination is made as to whether or not the 200×400 dpi button 410 is ON. If button 410 is ON, then in a step S478 the resolution is set to 200×400 dpi. If button 410 is not ON, then in a step S479 the resolution is set to 200×200 dpi and the process terminates.

In step S472 above, if the resolution of the original image is not 400×400 dpi, in the communications device 100 of the present embodiment the resolution of the original image is 600×600 dpi. As a result, in a step S480 a determination is made as to whether or not a 600×600 dpi button 413 is ON. If the 600×600 dpi button 413 is ON, the resolution is set to a magnification of 600×600 dpi in a step S481 and the process terminates.

If, however, in step S480 above the 600×600 dpi button 413 is not ON, then in a step S482 a determination is made as to whether or not the 400×400 button 412 is ON. If button 412 is ON, then the resolution of the original image is set at 400×400 dpi in a step S483 and the process terminates.

If button 412 is not ON, however, then in a step S484 a determination is made as to whether or not the 300×300 dpi button 411 is ON. If button 411 is ON, then the resolution is set at 300×300 dpi in a step S485 and the process terminates.

If, however, the 300×300 dpi button 411 is still not ON, then in a step S486 a check is made to determine if the 200×400 dpi button 410 is ON. If button 410 is ON, in a step S487 the resolution is set to 200×400 dpi. If button 410 is not ON, then in a step S488 the resolution is set to 200×200 dpi and the process terminates.

In step S424 of FIG. 11 described above, an image processor 424 sets the resolution of the image to a designated resolution according to the paper size specified in the paper size designation process (depicted in FIG. 12) and the image compression method specified in the compression method designation process (shown in FIG. 13), in that order.

Figure 15:
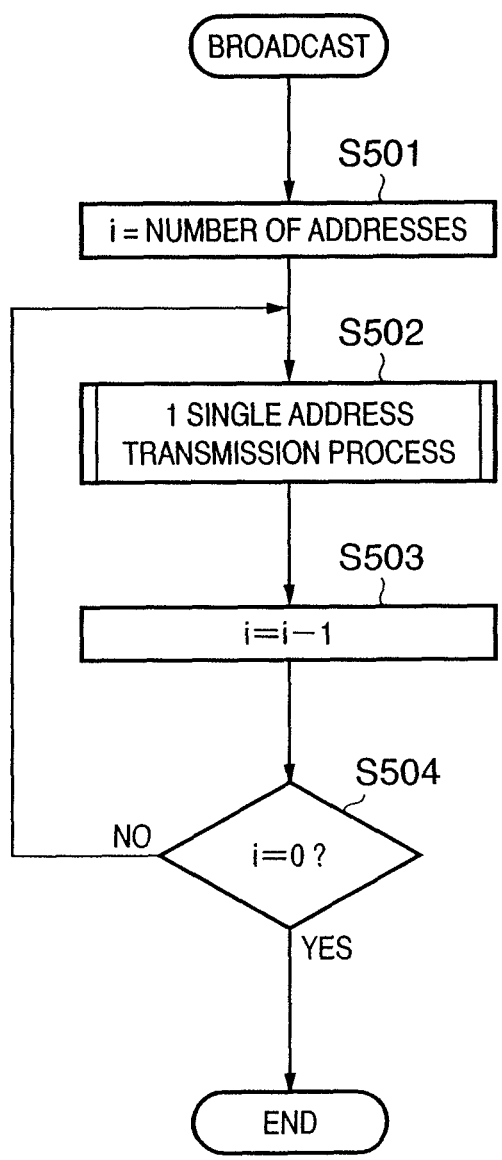
FIG. 15 is a flow chart illustrating the process of broadcasting with the communications device according to one embodiment of the present invention.

A description is now given of a broadcast process, with reference to FIG. 15.

FIG. 15 is a flow chart illustrating the process of broadcasting with the communications device according to one embodiment of the present invention, that is, of sending an image generated by the processes shown in FIG. 11 to a plurality of addresses.

When broadcasting begins, in a step S501 the number of addresses to which the image is to be broadcasted is set as the variable i. In a step S502, the communications device 100 executes an address transmission process to be described later with reference to FIG. 17. In a step S503, the communications device 100 subtracts 1 from the variable i.

Next, in a step S504, a determination is made as to whether or not the variable i is zero (hereinafter 0). If the variable i is not 0, then the process returns to step S502 and repeats the process of sending to a single address. If, however, the variable i is 0, then the process terminates. Thus, by repeating the process of transmitting to a single address however many times there are address to be broadcasted to, the process of broadcasting an image is executed.

Figure 16:
FIG. 16 is a diagram showing part of an example of a setting for the servers of FIG. 1.

A description is now given of the settings of the servers of the communications device 100, with reference to FIG. 16.

FIG. 16 is a diagram showing part of an example of a setting for the servers of FIG. 1.

FIG. 16 shows lines 520 through 531 of the setting file. Inline 520, the IP address of pulser.xyz.co.jp is defined as 99.99.99.99, and in line 521 the IP address of backup.xyz-.co.jp is defined as 99.99.99.100.

Lines 522 and 523 are MX (Mail exchange) records defining the operations performed at reception of all e-mail addressed to xyz.co.jp. Line 522 indicates that transmission to pulser.xyz.co.jp is weighted at level 10 and line 523 indicates that transmission to backup.xyz.co.jp is weighted at level 20.

In the present embodiment, the servers 12 and second server 21 are designed to operate so as to accord priority to the sending of e-mail to addresses having a lower weighting, so when e-mail addressed to xyz.co.jp is received the servers 12 and second server 21 transmit the e-mail received to pulser.xyz.co.jp first. If, for example, the power is OFF at pulser.xyz.co.jp and the mail cannot be sent, it is sent instead to backup.xyz.co.jp.

Line 524 defines the IP address of figaro.xyz.co.jp as 99.99.99.101. Lines 525, 526 and 527 indicate respectively that e-mail addressed to figaro.xyz.co.jp is sent to figaro.xyz.co.jp with a weighting of level 10, to pulser.xyz.co.jp with a weighting of level 20 and to backup.xyz.co.jp with a weighting of level 30.

Accordingly, when the first server 12 and second server 21 receive e-mail addressed to figaro xyz.co.jp, the servers 12 and second server 21 send the e-mail to figaro.xyz.co.jp first. However, if the servers 12 and 21 cannot send the e-mail to figaro.xyz.co.jp, they send the e-mail to pulser.xyz.co.jp. If the servers 12, 21 cannot send the e-mail to pulser.xyz.co.jp either, they send it to backup.xyz.co.jp.

In line 528, the IP address of figaro2.xyz.co.jp is defined as 99.99.99.101. Lines 529, 530 and 531 respectively indicate that e-mail addressed to figaro2.xyz.co.jp should be sent to figaro2.xyz.co.jp at a weighting 10, to pulser.xyz.co.jp at a weighting 20 and to backup.xyz.co.jp at a weighting 30.

Accordingly, when the first and second servers 12 and 21 receive e-mail addressed to figaro2.xyz.co.jp, the servers first send the e-mail to figaro2.xyz.co.jp. If they cannot send the e-mail to figaro2.xyz.co.jp they send it to pulser.xyz.co.jp, and if they cannot send it even to pulser.xyz.co.jp they send it to backup.xyz.co.jp.

Figure 17:
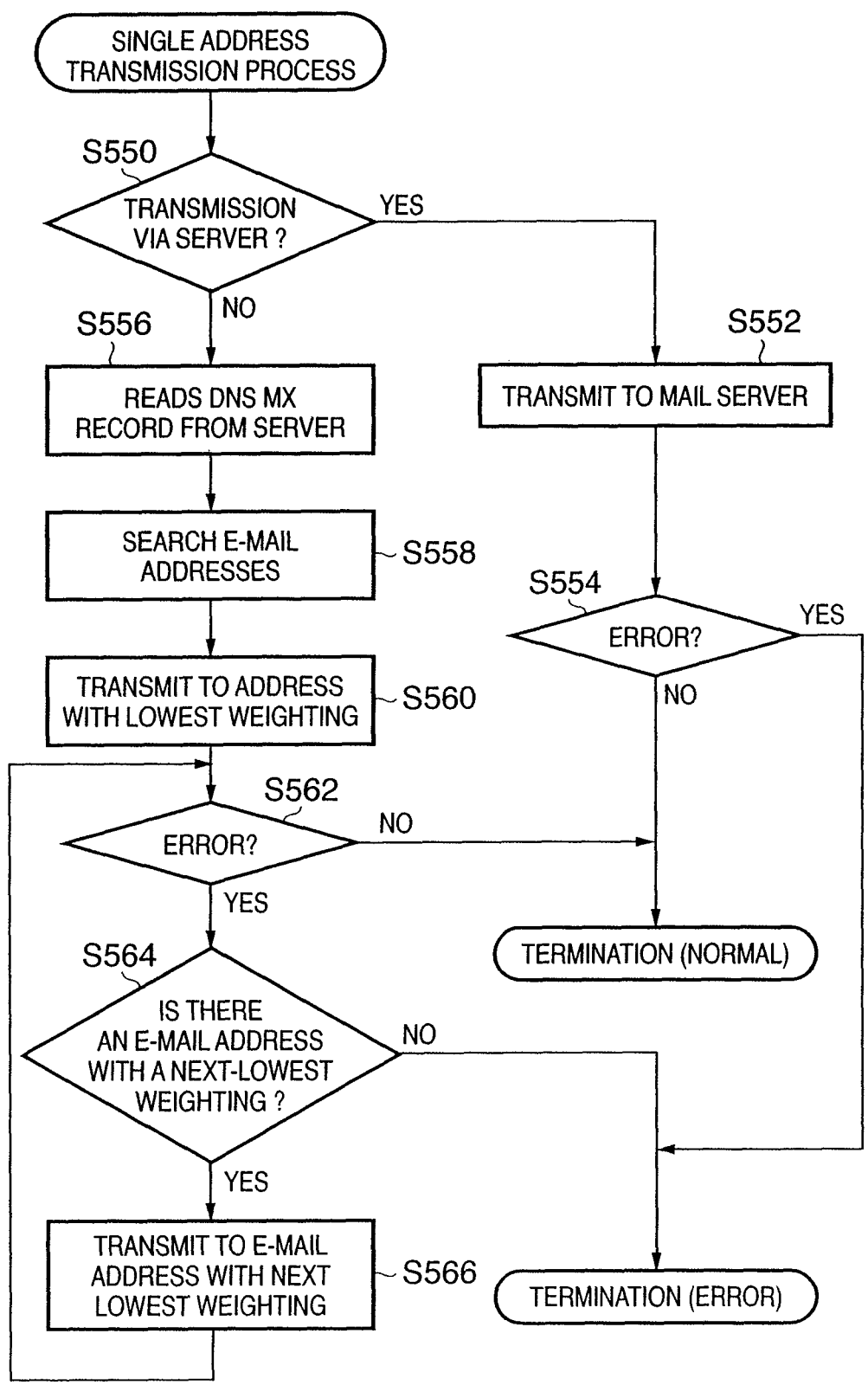
FIG. 17 is a flow chart illustrating the process of transmitting e-mail to a single address of the communications device according to one embodiment of the present invention.

FIG. 17 is a flow chart illustrating the process of transmitting e-mail to a single address of the communications device according to one embodiment of the present invention. FIG. 17 shows the sending of an e-mail to figaro2.xyz.co.jp.

When transmission is commenced, the process moves to the broadcasting shown in FIG. 15, and in step S502 transmission to a single address is executed.

First, in a step S550 the setting of the route selection button 402 that corresponds to the recipient's e-mail address, that is, whether or not to send the e-mail via a server, is confirmed from the address book. If the e-mail is to be sent via server, then in a step S552 data is sent to the first server 12.

In a step S554, a check is made to determine if any errors arose during transmission to the server. If an error has occurred the communications device 100 indicates same, and if no error has occurred the sending of an e-mail to a single address is indicated as successful and the process terminates.

If in step S550 the route selection button 402 is set so that the e-mail is not sent via server, then in a step S556 a DNS MX record like that shown in FIG. 16 is obtained from the first server 12 using DNS protocol.

In a step S558, the DNS MX record so obtained is searched for the address figaro2.xyz.co.jp, the address with the lowest weighting (in this case figaro2.xyz.co.jp) is found and (in a step S560) the e-mail is sent. In a step S562, a check is made to determine if any errors arose during transmission. If no error has occurred, the sending of an e-mail to a single address is indicated as successful and the process terminates.

If an error in transmission has occurred, then a search is conducted as to whether or not there is an address of next lowest weighting in the DNS MX record in a step S564. If there is no such address, then the transmission ends in error. If, however, there is an address of next lowest weighting, then transmission to that address is carried out in a step S566. In the present example, an address with a next lowest weighting to that of figaro2.xyz.co.jp does exist (pulser.xyz.co.jp), so the e-mail is sent to pulser.xyz.co.jp.

Once more, a check is made in step S562 to determine if an error has occurred during transmission, and, if there is no error, the process of transmitting to a single address ends successfully.

If there is an error in the transmission, a search of the DNS MX record is conducted to determine whether or not there is an address of next lowest weighting in a step S564, and, if no such address exists, the process ends in a transmission error. If, however, such an address of next lowest weighting does exist, then transmission to that address is carried out in a step S566. In the present example, the address of weighting next lowest to that of pulser.xyz.co.jp is backup.xyz.co.jp, so the e-mail is sent to backup.xyz.co.jp.

Thus, as described above, by using the DNS MX records obtained from the server and making it possible to execute at a communications device transmissions just like those carried out by a server, it becomes possible to select either to send e-mail through a server (or servers) or to send e-mail not through server.

It should be noted that the acquisition of the DNS MX records and the generation of packets of a form appropriate to the recipient address are executed by the core 10 and network I/F 7 described above.

Figure 18:
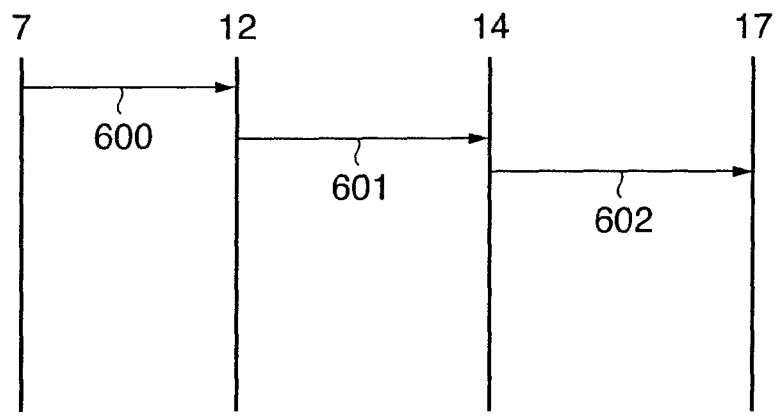
FIG. 18 is a sequence chart illustrating simple mode transmission of the communications device according to one embodiment of the present invention.
Figure 19:
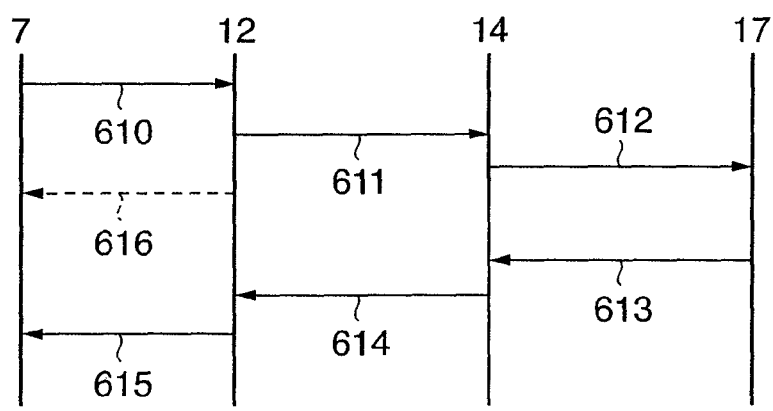
FIG. 19 is a sequence chart illustrating Full Mode transmission (successful) of the communications device according to one embodiment of the present invention.
Figure 20:
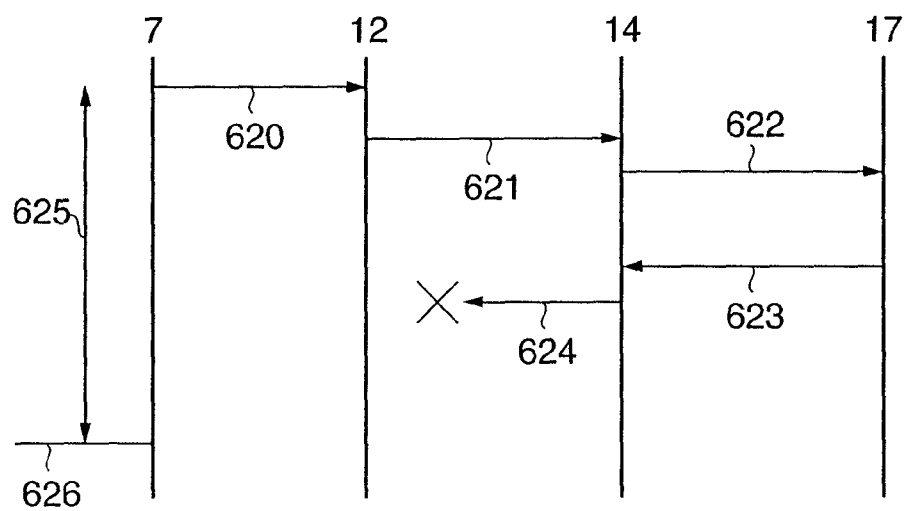
FIG. 20 is a sequence chart illustrating Full Mode transmission (failure) of the communications device according to one embodiment of the present invention.

A description is now given of transmission by Simple Mode and by Full Mode, with reference to FIGS. 18, 19 and 20.

FIG. 18 is a sequence chart illustrating Simple Mode transmission of the communications device according to one embodiment of the present invention. As described above, in the communications device 100 according to the present embodiment, for each address registered in the address book it is possible to designate sending mail by Simple Mode or by Full Mode using the mode switching button 401.

FIG. 18 shows a sequence for transmitting to an Internet facsimile machine 17 (ifax@abc.co.jp of FIG. 1) from the network I/F 7 (ifax@figaro.xyz.co.jp). In this case, the transmission is routed through one or more servers (including first and second servers 12 and 14) because it takes place via the Internet 13.

In other words, the e-mail transmitted from the network I/F 7 of the communications device 100 is sent to the first server 12 (600), then to a third server 14 via the Internet 13 (601), and finally to the Internet facsimile machine 17 (602).

FIG. 19 is a sequence chart illustrating Full Mode transmission (successful) of the communications device according to one embodiment of the present invention. Shown in FIG. 19 is the sequence that takes place when transmitting an e-mail to a recipient selected for Full Mode with the mode selection switch button 401 of the address book, and, as with FIG. 18, depicts a case in which image data in the form an of an e-mail is transmitted to the Internet facsimile machine 17 from the network I/F 7 (ifax@figaro.xyz.co.jp).

The e-mail to be sent passes through stages 610, 611 and 612 that correspond to stages 600, 601 and 602, and then sent to the Internet facsimile machine 17. Upon receipt of the e-mail, the Internet facsimile machine 17 forms an image based on the e-mail image data in the form of an attachment file to the e-mail, and returns to the network I/F 7 a Message Disposition Notification (hereinafter MDN) indicating the disposition of the message so sent, i.e., whether successful or a failure (613).

The MDN returns via the reverse of the path taken to send the e-mail (613, 614, 615), from the Internet facsimile machine 17 that is the receiving device to the network I/F 7 that is the sending device.

When the network I/F 7 receives the MDN from the Internet facsimile machine 17, the process of sending the e-mail is completed, the results of the transmission (i.e., success/failure) are registered in a transmission log (to be described later with reference to FIG. 21) and a transmission result report (to be described later with reference to FIG. 22) is printed.

If, after the first server 12 receives the e-mail addressed to the Internet facsimile machine 17 from the network I/F 7 (610), the first server 12 is unable to successfully forward the e-mail to the third server 14 due for example to some malfunction at the third server 14, the first server 12 transmits an error message e-mail in the form of a DSN (Delivery Status Notification) to the network I/F 7 of the communications device 100 (616).

When a DSN error message is received, the network I/F 7 terminates the e-mail transmission process, records a transmission error in the transmission log (to be described later with reference to FIG. 21) and prints a transmission result report (to be described later with reference to FIG. 22).

FIG. 20 is a sequence chart illustrating Full Mode transmission (failure) of the communications device according to one embodiment of the present invention.

The steps involved in transmission and the processes performed by the Internet facsimile machine 17 are the same as those described with reference to FIG. 19 above. The Internet facsimile machine 17, after forming an image, sends an MDN to the third server 14 (623).

The MDN is sent from the third server 14 to the first server 12, but if, as here, the transmission is not successful, the MDN is sent to the manager of the third server 14 without reaching the first server 12.

In this case, the network I/F 7, which is the sending device, forces a time (626) out when a predetermined length of time has passed from the start of e-mail transmission (625).

When a time out appears, a transmission status uncertain is recorded in the transmission log (to be described later with reference to FIG. 21) and a transmission result report (to be described later with reference to FIG. 22) is printed indicating that the transmission status is uncertain.

FIG. 21 is a diagram showing an example of a transmission result (transmission log) recorded at the communications device according to one embodiment of the present invention. The transmission log, for example, can be displayed at the control panel 115 and/or printed out by operation of the appropriate controls 115.

The transmission log consists of several item entries that may include a date of transmission, time of transmission, reception number, recipient address, transmission mode (whether Simple or Full) and transmission result (i.e., successful indicated by "OK", failure indicated by "NG", or uncertain indicated by a double dash "-").

When the transmission log is displayed at the control panel 115, the display may include the last ten transmissions, beginning, for example, with the oldest. Transmission results having the same reception number indicate broadcasts. In FIG. 21, for example, messages denoted by reference numerals 851, 852 and 853 have the same reception number (that is, rec. no. 0578) were broadcast (i.e., sent simultaneously) to three different recipients. Similarly, the messages denoted by reference numerals 855 and 856, which have the same reception number 0578, and the messages denoted by reference numerals 857 and 858, which have the same reception number 0571, have each been broadcast to two different recipients, respectively.

Messages 850 through 852 have been sent by Full Mode, and a MDN sent back from the receiving device indicates that the transmission was successful, so a message to that effect (i.e., "OK") is displayed in the transmission result column.

Message 853 has been sent via the Simple Mode described in FIG. 18. With Simple Mode transmission, the, it is possible to confirm whether or not the e-mail sent has been safely transmitted to the nearest mail server, but after that the transmission status of the e-mail cannot be confirmed. In this example, it has been confirmed that message 853 has been safely transmitted to the nearest mail server, so for that reason the double dash "-" indicating transmission status uncertain is displayed in the transmission result column. By contrast, if an error occurs in the transmission to the nearest mail server, "NG" would be recorded in the transmission result column.

In the example shown in FIG. 21, message 854 has been sent by the Full Mode described in FIG. 20 and has successfully reached the nearest mail server, but since a MDN has not been received in return within the predetermined time period a transmission Time Out has been called and the double dash "-" indicated transmission status is uncertain is recorded in the transmission result column.

Message 855 has been sent by Full Mode, but either an error has occurred in transmission as indicated by the MDN or an error has occurred at an intermediate mail server as indicated by the DSN issued by the server, so the message "NG" indicating an error is displayed in the transmission result column.

Messages 856-858 have been sent by Full Mode and a MDN sent back from the receiving device indicating that the transmission was successful has been received within the predetermined time period, so the transmission result column reads "OK".

Message 859 has been sent by the Simple Mode described in FIG. 18. Although it has been successfully sent to the mail server, it is unclear whether or not the e-mail has reached the intended recipient, so the double dash "-" indicating transmission status uncertain is displayed in the transmission result column.

FIG. 22 is a diagram showing an example of a transmission result report output by the communications device according to one embodiment of the present invention.

Shown in FIG. 22 is a transmission result report for the transmission of message 856 of FIG. 20. The reception number 950 is "0580", the time of transmission commencement is "11/01 9:30", and the number of pages 952 shows the number of pages sent.

Reference numeral 953 denotes the intended recipient of the e-mail transmission, showing the address(es) to which the message was not transmitted because a broadcast was cancelled at the first entry or because processing was completed in the middle of a plurality of operations, or for some other similar reason.

Reference numeral 954 denotes an address to which an e-mail has been successfully sent. In the present example, ifax@abc.co.jp and its abbreviated name iFAX(abc) are entered herein. When messages with the reception number 0578 in FIG. 21 are transmitted, the addresses and abbreviated names of the intended recipients of messages 851-853 are entered in this column. Similarly, when messages with the reception number 0579 in FIG. 21 are transmitted, the addresses and abbreviated names of the intended recipients of messages 854 and 855 are entered in this column.

Reference numeral 955 denotes an intended recipient of a message found to have experienced an error in transmission. The address (in this case, abc@abc.co.jp) and abbreviated name of the intended recipient is output to this space in a report on transmission 855 (reception number 0579) of FIG. 21.

It should be noted that the abbreviated name of the intended recipient which is output to a transmission result report can be obtained by searching the address book using the intended recipient's address of the transmission log if the abbreviated name has been previously registered in the address book, for example.

It should be noted that, in the above-described embodiment, the recipient address search when transmitting an e-mail not through a server has been described with reference only to the use of DNS MX records obtained from the server. However, as can be appreciated by those of ordinary skill in the art, it is of course also possible to transmit e-mail to an IP address obtained normally using a DNS server, such as 99.99.99.101 with figaro.xyz.co.jp, for example.

In addition, although the above-described embodiment is described in terms of a communications device composed of a single device. However, as can be appreciated by those of ordinary skill in the art, the present invention may also be implemented by a system comprising a plurality of devices identical to the communications device 100 of the present invention.

It should be noted that a software program for implementing the capabilities of the above-described embodiments (that is a program corresponding to one or more of the flow charts shown in FIGS. 11-15 and 17-20), supplied either directly from a recording medium or by using wire or wireless communications, to a system or apparatus having a computer capable of executing such program, the execution of such program by the computer of the system or apparatus achieving equivalent capabilities of the above-described embodiments, is included in the present invention.

Accordingly, a program supplied to and installed in such a computer for the purpose of implementing the functional processes of the present invention itself achieves the present invention. That is, a computer program for implementing the processes performed by the present invention is itself included within the present invention.

In such a case, provided the program capabilities are present, the format of the program, whether executed by object code or by an interpreter, for example, does not matter.

The recording medium for supplying the program include, but are not limited to, magnetic recording media such as a floppy disk, a hard disk or magnetic tape, optical or magneto-optical recording media such as MO, CD-ROM, CD-R, CD-RW, DVD-ROM, DVD-R or DVD-RW, or a non-volatile semiconductor memory.

Wire and wireless methods of supplying the program to the system or apparatus described above include, but are not limited to, a computer program that forms the present invention on a server on the computer network, or storing a data file (that is, a program data file) that can become a computer program that forms the present invention on a client computer, such as a compressed file with a self-installing capability, and downloading the program data file to a connected client computer. In this case, the program data file can be divided into a plurality of segment files and the segment files disposed at different servers.

In other words, a server device that downloads to a plurality of users a program data file for implementing the function processes of the present invention by computer is also included within the present invention.

As can be appreciated by those of ordinary skill in the art, the program of the present invention may be encrypted and stored on a recording medium such as a CD-ROM and distributed to users, with decryption data for decrypting the encryption being made available to users who fulfill certain conditions for example by downloading from a home page via the Internet, the users then using the decryption data to execute the encrypted program for installation on a computer.

In addition, as can be appreciated by those of ordinary skill in the art, in addition to implementing the capabilities of the above-described embodiments by reading out and executing the above-described program by computer, the above-described capabilities of the embodiments described above can also be implemented by Operating System (OS) software running on a computer and performing some or all of the actual processes described heretofore based on the program instructions.

Moreover, the present invention also includes an instance in which the above-described capabilities of the embodiments described above are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

As described above, the communications device of the present invention enables the user to select, on an address-by-address basis, whether to send an e-mail through a mail server or not, and is provided with a configuration that can send given e-mail directly to the recipient without going through a mail server, such that e-mail can be sent without going through a server to those addresses which can be reached by e-mail without passing through a server, with the result that large amounts of data can be transmitted without imposing a burden on the mail server. Moreover, the ability to send e-mail directly to a recipient without going through a mail server guarantees prompt delivery of e-mail messages.

The present application claims priority from Japanese Patent Application No. 2002-30918 filed on Feb. 7, 2002, the contents of which are hereby incorporated by reference.

The present invention is not limited to the above embodiments, and various changes and modifications can be made within the spirit and scope of the present invention. Therefore, to apprise the public of the scope of the present invention, the following claims are made.

The invention claimed is:

1. A communication device comprising:
   a setting unit configured to set recipient e-mail addresses for transmitting e-mail data via a mail server or for transmitting e-mail data via a route that does not include any mail server, designated by a user;
   a generating unit configured to generate the e-mail data having image data; and
   a transmission unit configured to transmit the e-mail data generated by the generating unit to the recipient e-mail addresses set by the setting unit, wherein, when a plurality of different recipient e-mail addresses including both at least one recipient e-mail address to which the generated e-mail data is to be transmitted via the mail server and at least one other recipient e-mail address to which the generated e-mail data is to be transmitted via a route that does not include any mail server are set by the setting unit, said transmission unit automatically transmits the generated e-mail data to each of the set recipient e-mail addresses by (i) transmitting the generated e-mail data via the mail server, to the at least one recipient e-mail address to which the generated e-mail data is to be transmitted via the mail server, and (ii) transmitting the generated e-mail data via the route that does not include the mail server to the at least one recipient e-mail address to which the generated e-mail data is to be transmitted via the route that does not include the mail server.

2. The communications device according to claim 1, wherein the image data is facsimile image data.

3. The communication device according to claim 1, further comprising an acquiring unit configured to acquire, from a DNS sever, an IP address corresponding to the designated recipient e-mail addresses,
wherein the transmission unit transmits the generated e-mail data to the at least one recipient e-mail address to which the generated e-mail data is to be transmitted via the route that does not include the mail server, by using the IP address acquired by the acquiring unit.

4. The communications device according to claim 1, further comprising a registration unit configured to register recipient information for each of a plurality of different recipients, wherein the recipient information includes at least a recipient e-mail address having predetermined domain information and transmission routing information.

5. The communication device according to claim 4, wherein the transmission routing information is selected from plural types of transmission routing information including at least first transmission routing information which indicates that the generated e-mail data is to be transmitted via the mail server, and second transmission routing information which indicates that the generated e-mail data is to be transmitted via the route that does not include the mail server.

6. A method for controlling a communications device, the method comprising:
setting recipient e-mail addresses for transmitting e-mail data via a mail server or for transmitting e-mail data via a route that does not include any mail server, designated by a user;
generating the e-mail data having image data; and
transmitting the generated e-mail data to the set recipient e-mail addresses, wherein, when a plurality of recipient e-mail addresses including both at least one recipient e-mail address to which the generated e-mail data is to be transmitted via the mail server and at least one other recipient e-mail address to which the generated e-mail data is to be transmitted via a route that does not include any mail server are set, it is automatically performed to transmit the generated e-mail data to each of the set recipient e-mail addresses by (i) transmitting the generated e-mail data via the mail server, to the at least one recipient e-mail address to which the generated e-mail data is to be transmitted via the mail server, and (ii) transmitting the generated e-mail data via the route that does not include the mail server to the at least one recipient e-mail address to which the generated e-mail data is to be transmitted via the route that does not include the mail server.

7. The method according to claim 6, wherein the image data is facsimile image data.

8. A non-transitory computer-readable storage medium on which is stored a computer-executable program for causing a computer to execute a method for a communications device, the program comprising computer-executable code that, when executed by a computer, causes the computer to perform the steps of:
setting recipient e-mail addresses for transmitting e-mail data via a mail server or for transmitting e-mail data via a route that does not include any mail server, designated by a user;
generating the e-mail data having image data; and
transmitting the generated e-mail data to the set recipient e-mail addresses,
wherein, when a plurality of recipient e-mail addresses including at least one recipient e-mail address to which the generated e-mail data is to be transmitted via the mail server and at least one other recipient e-mail address to which the generated e-mail data is to be transmitted via a route that does not include any mail server are set, it is automatically performed to transmit the generated e-mail data to each of the set recipient e-mail addresses by (i) transmitting the generated e-mail data via the mail server, to the at least one recipient e-mail address to which the generated e-mail data is to be transmitted via the mail server, and (ii) transmitting the generated e-mail data via the route that does not include the mail server to the at least one recipient e-mail address to which the generated e-mail data is to be transmitted via the route that does not include the mail server.

* * * * *